(12) United States Patent
Glanville et al.

(10) Patent No.: US 7,268,785 B1
(45) Date of Patent: Sep. 11, 2007

(54) SYSTEM AND METHOD FOR INTERFACING GRAPHICS PROGRAM MODULES

(75) Inventors: Robert Steven Glanville, Cupertino, CA (US); Mark J. Kilgard, Austin, TX (US); Kurt B. Akeley, Mountain View, CA (US); William R. Mark, Mountain View, CA (US)

(73) Assignee: NVIDIA Corporation, Santa Clara, CA (US)

( * ) Notice: Subject to any disclaimer, the term of this patent is extended or adjusted under 35 U.S.C. 154(b) by 1000 days.

(21) Appl. No.: 10/327,307

(22) Filed: Dec. 19, 2002

(51) Int. Cl.
 *G06T 1/20* (2006.01)
 *G06F 15/167* (2006.01)
(52) U.S. Cl. ..................... 345/506; 345/541
(58) Field of Classification Search ............... 345/506, 345/531, 541, 542
See application file for complete search history.

(56) References Cited

U.S. PATENT DOCUMENTS

| 5,109,504 | A * | 4/1992 | Littleton ..................... 345/501 |
| 6,317,135 | B1 * | 11/2001 | Reddy ......................... 345/519 |
| 6,801,203 | B1 * | 10/2004 | Hussain ...................... 345/506 |
| 6,867,782 | B2 * | 3/2005 | Gaudette et al. ............ 345/530 |
| 6,891,543 | B2 * | 5/2005 | Wyatt ......................... 345/541 |
| 2002/0171652 | A1 * | 11/2002 | Perego ........................ 345/542 |
| 2004/0015675 | A1 * | 1/2004 | Kyker et al. ................ 711/207 |

OTHER PUBLICATIONS

Phil C. C. Yeh et al., Performance of Shared Cache for Parallel-Pipelined Computer Systems, 1983, pp. 117-123.*
NVIDIA Technical Brief, The Nvidia Cg Compiler, C for Graphics, TB-00511-001-v01; Jun. 12, 2002.

* cited by examiner

*Primary Examiner*—Ulka J. Chauhan
*Assistant Examiner*—Dan Washburn
(74) *Attorney, Agent, or Firm*—Patterson & Sheridan, LLP

(57) ABSTRACT

A system and method for interfacing graphics program modules written to execute on a plurality of functional units of a graphics processor using a shared memory. A central processing unit (CPU) receives a first graphics program module that outputs a first parameter referenced by a first graphics program module identifier, a second graphics program module that inputs the first parameter by referencing the first graphics program module identifier, and a first data structure that includes, in a pre-defined order, a list of first data structure identifiers. The CPU identifies a memory location in the shared memory, based on the pre-defined order of the first data structure identifiers, for one of the first data structure identifiers that is the same as the first graphics program module identifier. The CPU modifies the first and second graphics program modules to reference the first parameter by the identified memory location in the shared memory.

99 Claims, 7 Drawing Sheets

```
205
First Graphics Program Module myvf vertexprogram skinning (appdata vin
    uniform float m1,
    uniform float m2) { myvf O;
O.position = vin.w1*(m1(.)vin.pos)
           + vin.w2*(m2(.)vin.pos);
O.color = vin.color;
O.uv = vin.uv;
return O;
}
```

FIG. 3A

```
210
Second Graphics Program Module fragout fragmentprogram texture (myvf In,
    uniform texobj t) { fragout O;
O.COL = In.color * f4tex2D(t, In.uv);
O.POS = In.position
return O;
}
```

FIG. 3B

```
215
First Data Structure vertex2fragment connector myvf { float2 position;
    float2 color;
    float uv;
};
```

FIG. 3C

360
| Shared Memory |
|---|
| location 1: position |
| location 2: color |
| location 3: uv |
| |

380
| Alternative Shared Memory | |
|---|---|
| location 1: position | location 2: color |
| location 3: uv | |
| | |

SYSTEM AND METHOD FOR INTERFACING GRAPHICS PROGRAM MODULES

BACKGROUND

1. Field of the Invention

The invention is in the field of computer graphics, and more particularly to interfacing computer graphics programs.

2. Description of the Prior Art

Typically, to get the greatest performance from a graphics processor, graphics programs are written in assembly code for a specific graphics processor. Using assembly code is highly restrictive because it does not allow for abstractions and optimizations. In particular, in assembly code, programmers must reference parameters associated with an image using actual hardware addresses of a memory location where a particular parameter is stored. For example, a parameter such as color must be referenced in assembly code with the actual hardware address of the memory location, such as a register number or name, where the color parameter is to be stored.

The hardware addressing of parameters at the assembly code level, referred to as absolute addressing, does not allow for hardware abstraction in the programming and creates two significant problems. First, it is difficult to change an assembly code program if a particular parameter needs to be stored in a different memory location because each hardware address of the memory location in the assembly code program must be changed. Second, it is difficult to use the assembly code program with other graphics processors because the parameters in the assembly code have been referenced by hardware addresses that are specific to the graphics processor it was originally written for. Therefore, the ability to "mix and match" an assembly code program with different graphics processors is limited in the prior art. In addition, assembly code programs are not self-explanatory and difficult to read because only hardware addresses are used to reference parameters instead of parameter identifiers, such as color or position.

These problems are magnified when a first assembly code program is interfaced to a second assembly code program where the first assembly code program outputs graphics data that is used by the second assembly code program. When interfacing the first assembly code program to the second assembly code program, the parameters output by the first assembly code program and the parameters input by the second assembly code program must first be ascertained to determine the compatibility of the first and second assembly code programs. To determine compatibility, the code of the first and second assembly code programs must be thoroughly examined to locate all hardware addresses, to determine the parameter referenced by each hardware address, and to determine any common parameters between the first and second assembly code programs. The first and second assembly code programs must then be modified so that the hardware addresses that reference common parameters match between the first and second assembly code programs. This allows the correct graphics data for each common parameter to be passed from the first assembly code program to the second assembly code program.

Therefore, the hardware addresses and parameters of the first and second assembly code programs must be known before compatibility can be determined. Also, extensive modifications of the first and second assembly code programs may need to be performed before they can be interfaced. Thus, the ability to interface or "mix and match" different assembly code programs is limited in the prior art.

Therefore, there is a need for a system and method for allowing hardware abstraction in the interfacing of graphics program modules to allow graphics program modules to be independent of the details of the hardware-level interface. This system and method should allow the graphics program modules to be independent of the actual hardware addresses of a particular graphics processor and thus allow greater "mixing and matching" ability between a graphics program module and various graphics processors. Also, this system and method should provide a fast and easy way to determine and provide compatibility between a first and second graphics program module to allow greater ability to interface or "mix and match" a graphics program module to other graphics program modules.

SUMMARY

The present invention comprises a system and method for interfacing graphics program modules written to execute on a plurality of functional units of a graphics processor using a shared memory. The method of interfacing the graphics program modules comprises inputting a first graphics program module that outputs a first parameter referenced by a first graphics program module identifier and inputting a second graphics program module that inputs the first parameter by referencing the first graphics program module identifier. The method further comprises inputting a data structure that includes, in a pre-defined order, a list of first data structure identifiers and identifying a memory location in the shared memory, based on the pre-defined order of the first data structure identifiers, for one of the first data structure identifiers that is the same as the first graphics program module identifier. The first and second graphics program modules are then modified to reference the first parameter by the identified memory location in the shared memory.

The system comprises the shared memory and a central processing unit (CPU) coupled to the shared memory. The CPU receives a first graphics program module that outputs a first parameter referenced by a first graphics program module identifier, a second graphics program module that inputs the first parameter by referencing the first graphics program module identifier, and a first data structure that includes, in a pre-defined order, a list of first data structure identifiers. The CPU then identifies a memory location in the shared memory, based on the pre-defined order of the first data structure identifiers, for one of the first data structure identifiers that is the same as the first graphics program module identifier. The CPU also modifies the first and second graphics program modules to reference the first parameter by the identified memory location in the shared memory.

BRIEF DESCRIPTION OF THE VARIOUS VIEWS OF THE DRAWINGS

Accompanying drawing(s) show exemplary embodiment(s) in accordance with one or more aspects of the present invention; however, the accompanying drawing(s) should not be taken to limit the present invention to the embodiment(s) shown, but are for explanation and understanding only.

FIGS. 3A to 3C show examples of software code used in the present invention;

FIGS. 3D and 3E show exemplary contents of memory locations in shared memory resulting from software code shown in FIGS. 3A to 3C;

DETAILED DESCRIPTION

Figure 1:
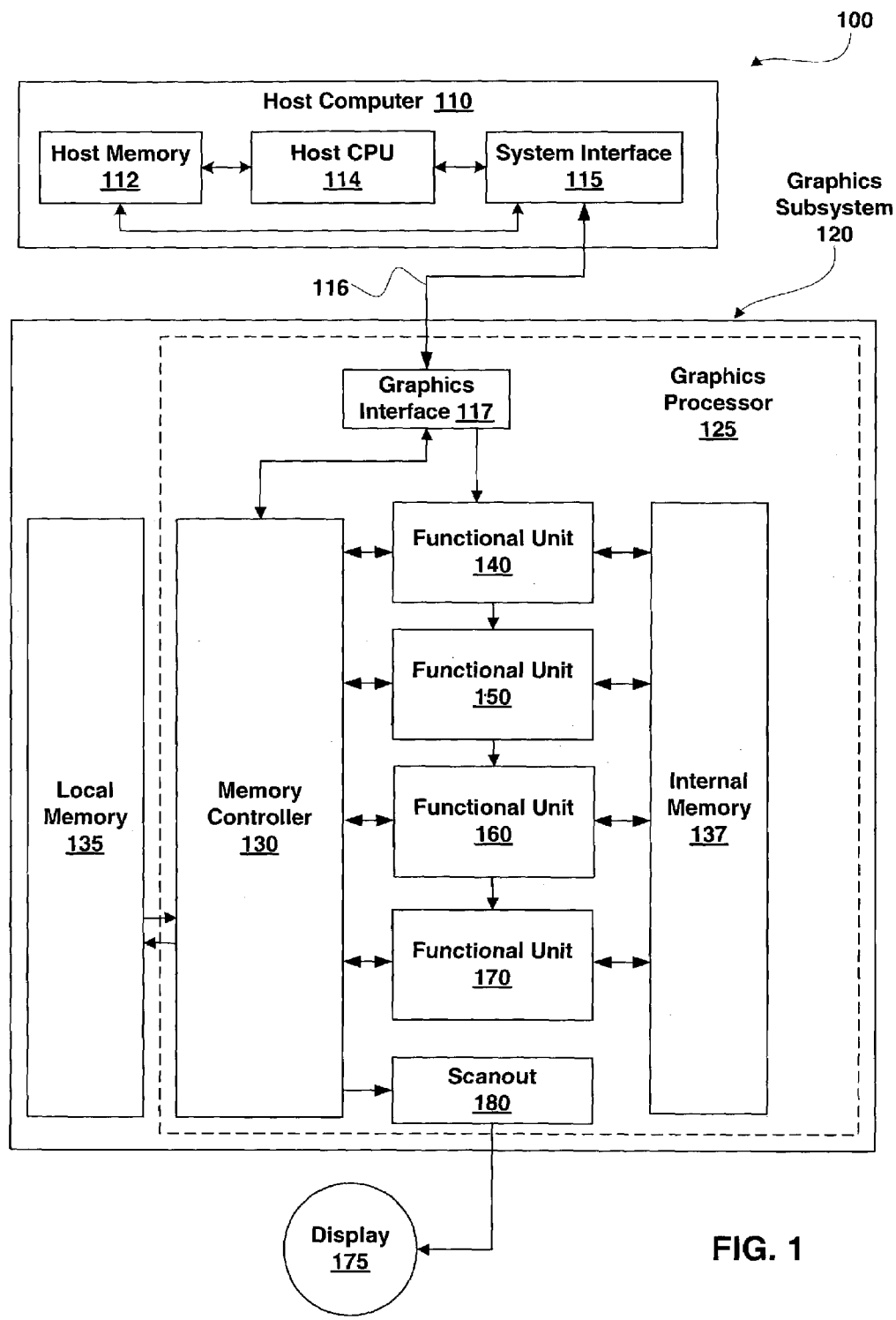
FIG. 1 is a block diagram illustrating a computing system wherein embodiments of the invention can be used.

FIG. 1 is an illustration of a Computing System 100 capable of utilizing the present invention. Computing System 100 may be a desktop computer, server, laptop computer, palm-sized computer, tablet computer, game console, cellular telephone, computer based simulator, or the like. Computing System 100 includes a Host Computer 110, a Graphics Subsystem 120, an External Bus 116, and a Display 175. Graphics Subsystem 120 contains a Graphics Processor 125 and a Local Memory 135. Graphics Processor 125 contains Functional Units 140, 150, 160, and 170, an Internal Memory 137, a Graphics Interface 117, a Memory Controller 130, and a Scanout 180. Host Computer 110 communicates with Graphics Subsystem 120 via External Bus 116 and Graphics Interface 117.

Host computer 110 includes a Host Memory 112, a Host Central Processing Unit (CPU) 114, and a System Interface 115. Host CPU 114 may include a system memory controller to interface directly to Host Memory 112. Or Host CPU 114 may interface with System Interface 115 and communicate with Host Memory 112 through System Interface 115. System Interface 115 may be an I/O (input/output) interface or a bridge device including the system memory controller to interface directly to Host Memory 112. Examples of System Interface 115 known in the art include Intel® Northbridge and Intel® Southbridge.

Host Computer 110 loads a host application into Host Memory 112 and Host CPU 114 executes program instructions of the host application. The host application generates streams of graphical data used to generate an image to be displayed on Display 175. Program instructions and graphical data are read from or stored to a memory resource, e.g., any combination of Host Memory 112, Local Memory 135, and Internal Memory 137. When a portion of Host Memory 112 is used to store program instructions and graphics data, the portion of Host Memory 112 can be uncached so as to increase performance of access by Graphics Processor 125.

Host Computer 110 communicates the graphical data used to generate an image to Graphics Subsystem 120 via System Interface 115, External Bus 116, and Graphics Interface 117. The graphical data generated by the host application typically consists of a high level description of a scene for display, and other high level information such as from where the scene is to be viewed, what textures should be applied to different primitives in the scene, and where lights are located in the scene. Display 175, however, is typically a simple device for accepting and outputting color information on a pixel-by-pixel basis and cannot interpret the graphical data from the host application. Therefore, the graphical data must be processed by Functional Units 140, 150, 160, and 170 of Graphics Processor 125 and translated into pixel color information for the image to be displayed on Display 175.

Functional Units 140, 150, 160, and 170 of Graphics Processor 125 are programmable units capable of executing compiled graphics programs (i.e., program instructions). Each Functional Unit 140, 150, 160, and 170 receives a compiled graphics program and particular parameters of graphical data, processes the parameters of graphical data according to instructions contained in the compiled graphics program, and outputs particular parameters of graphical data. Functional Units 140, 150, 160, and 170 can have varying degrees of programmability in terms of a range of functions that each can be programmed to perform.

For example, if Functional Unit 140 comprises a vertex processor, Functional Unit 140 has a relatively high degree of programmability and can be programmed to perform many different functions. As a further example, if Functional Unit 150 comprises a rasterizer, Functional Unit 150 has a relatively low degree of programmability and can be programmed to perform only a limited number of different functions. In an alternative embodiment, a Functional Unit 140, 150, 160, or 170 that has a relatively low degree of programmability receives configuration control (e.g., state bundles) rather than a compiled graphics program (see below). The number of functional units shown in Graphics Processor 125 is exemplary only. Graphics Processor 125 may be implemented with greater than four functional units or fewer than four functional units without departing from the scope of this invention.

Host Computer 110 also loads graphics program modules into Host Memory 112. Each graphics program module typically inputs particular parameters of graphical data, processes the inputted parameters of graphical data, and outputs particular parameters of graphical data. Each parameter (e.g., position coordinates) that is inputted or outputted by a graphics program module is referenced by an identifier (e.g., "position") in the graphics program module that uniquely identifies the parameter. A graphics program module is written to execute on a particular Functional Unit 140, 150, 160, or 170 of Graphics Processor 125. For example, if Functional Unit 140 is a vertex processor, a vertex graphics program module is written to execute on Functional Unit 140.

Host Computer 110 also loads a compiler program into Host Memory 112 and Host CPU 114 executes instructions of the compiler program. The compiler program executing on Host CPU 114 compiles graphics program modules to produce compiled graphics programs. A compiled graphics program inputs and outputs the same parameters as the graphics program module it is produced from and is executable on a particular Functional Unit 140, 150, 160, or 170 of Graphics Processor 125. Therefore, a graphics program module defines which parameters of graphical data are input and output by a compiled graphics program and the particular Functional Unit 140, 150, 160, or 170 that executes the compiled graphics program.

In an alternative embodiment, a Functional Unit 140, 150, 160, or 170 that has a relatively low degree of programmability receives configuration control (e.g., state bundles) rather than a compiled graphics program. Configuration control is stored in Host Memory 112 or Local Memory 135 and transmitted to a Functional Unit 140, 150, 160, or 170 without being compiled by the compiler program executing on Host CPU 114. The configuration control is written to execute on a particular Functional Unit 140, 150, 160, or 170 to configure the Functional Unit 140, 150, 160, or 170 receiving the configuration control to apply a transformation to particular parameters of received graphics data. For example, a Functional Unit 140, 150, 160, or 170 receiving the configuration control can be configured to operate in a point mode, a line mode, or a triangle mode or configured to produce linear interpolation, flat-shaded interpolation, or perspective-correct interpolation. The various modes and interpolations recited above are well known in art and thus are not explained in detail here.

Graphics Subsystem 120 receives graphics data, compiled graphics programs, or configuration control (optional) from Host Computer 110 through External Bus 116 and Graphics Interface 117. From Graphics Interface 117, the graphics data, compiled graphics programs, or configuration control is stored to Local Memory 135 via Memory Controller 130. A Functional Unit 140, 150, 160, and 170 then receives graphics data, a compiled graphics program, or configuration control from Local Memory 135 via Memory Controller 130. Memory Controller 130 arbitrates between hardware components of Graphics Subsystem 120 initiating requests to read from or write to Local Memory 135.

Alternatively, from Graphics Interface 117, the graphics data, compiled graphics programs, or configuration control are inputted directly to Functional Unit 140 and pipelined through the Functional Units 140, 150, 160, and 170 to reach a particular Functional Unit 140, 150, 160, or 170 configured to receive the graphics data, compiled graphics program or configuration control, respectively. In this case, if graphics data, a compiled graphics program, or configuration control is to be used by or executed on a particular Functional Unit 140, 150, 160, or 170, that particular Functional Unit 140, 150, 160, or 170 will use or execute the graphics data, compiled graphics program, or configuration control as it is received. Otherwise, the graphics data, compiled graphics program, or configuration control will pass through the Functional Unit 140, 150, 160, or 170 substantially unaltered. For example, if a compiled graphics program is written to execute on Functional Unit 160, the compiled graphics program will pass through Functional Units 140 and 150 substantially unaltered and then execute on Functional Unit 160.

Functional Unit 140 receives parameters of graphics data and a compiled graphics program or configuration control written to execute on Functional Unit 140 from Graphics Interface 117 or Memory Controller 130. Functional Unit 140 receives one or more parameters that are output by the host application executing on Host CPU 114, processes the one or more received parameters, and outputs one or more parameters. Functional Unit 140 may be any programmable unit capable of executing compiled graphics programs or configuration control. Preferably, however, Functional Unit 140 is a vertex processor that receives a compiled vertex program produced from a vertex program module. The graphics data inputted to the compiled vertex program and vertex processor (Functional Unit 140) typically includes parameters associated with vertices such as position coordinates (x,y,z), color, and texture coordinates (u,v). Typically, the compiled vertex program and vertex processor transform geometry data from an object-based coordinate representation to screen space and generate vertex data required to rasterize planar primitive data.

The one or more parameters of graphical data output by Functional Unit 140 are stored in a shared memory. The shared memory is preferably internal to Graphics Processor 125 (i.e., located on the same chip as Graphics Processor 125) such as Internal Memory 137. In an alternative embodiment, the shared memory is external to Graphics Processor 125 (i.e., not located on the same chip as Graphics Processor 125), such as Local Memory 135 or Host Memory 112. In a further embodiment, the shared memory is comprised of both a memory resource internal to Graphics Processor 125 and a memory resource external to Graphics Processor 125, such as Internal Memory 137 and Local Memory 135. A memory resource internal to Graphics Processor 125 typically has higher access performance than a memory resource external to Graphics Processor 125.

In a preferred embodiment, the shared memory is a set of registers. Memory locations in a set of registers can be identified by a register number alone or a register number with a register offset. Alternatively, the shared memory is any type or portion of memory such as a random access memory (RAM). In yet a further embodiment, the shared memory is comprised of a combination of different memory resource types. For example, the shared memory may comprise a set of registers and a RAM.

If Functional Unit 140 is a vertex processor, the graphics data output by Functional Unit 140 and stored to the shared memory is typically vertex data. Functional Unit 150 reads, from the shared memory, the graphics data output by Functional Unit 140. Functional Unit 150 also receives a compiled graphics program or configuration control written to execute on Functional Unit 150 from Graphics Interface 117 or Memory Controller 130.

Functional Unit 150 may be any programmable unit capable of executing compiled graphics programs or configuration control. Preferably, however, Functional Unit 150 is a rasterizer that typically receives vertex data defining a planar primitive. The rasterizer scan converts the vertex data to generate per pixel data including data for parameters such as position coordinates, color, texture coordinates, and the like. If Functional Unit 150 is a rasterizer, it also typically receives configuration control that configures Functional Unit 150 to apply a transformation to particular parameters of the graphics data received, via the shared memory, from Functional Unit 140. Thus, configuration control can be used to apply a transformation to particular parameters output by a graphics program module executing (in its compiled form) on Functional Unit 140. For example, Functional Unit 150 can be configured to operate in a point mode, a line mode, or a triangle mode or configured to produce linear interpolation, flat-shaded interpolation, or perspective-correct interpolation on particular parameters output by the graphics program module executing (in its compiled form) on Functional Unit 140.

Functional Unit 150 executes the received compiled graphics program and uses the inputted graphical data to produce outputted graphical data. The graphics data output by Functional Unit 150 is stored to shared memory. Functional Unit 160 reads, from the shared memory, the graphics data output by Functional Unit 150. Functional Unit 160 also receives a compiled graphics program written to execute on Functional Unit 160 from Memory Controller 130 or Functional Unit 150. Functional Unit 160 executes the inputted compiled graphics program and uses the inputted graphics data to generate outputted graphics data.

Functional Unit 160 may comprise any programmable unit capable of executing compiled graphics programs or configuration control. Preferably, however, Functional Unit 160 is a fragment processor (also referred to as a pixel shader). If Functional Unit 160 is a fragment processor, it typically receives per pixel data and determines values for parameters such as color and depth for each pixel.

The graphics data output by Functional Unit 160 is stored to shared memory. Functional Unit 170 reads from the shared memory the graphics data output by Functional Unit 160. Functional Unit 170 also receives a compiled graphics program written to execute on Functional Unit 160 from Memory Controller 130 or Functional Unit 160. Functional Unit 170 executes the inputted compiled graphics program and uses the inputted graphics data to generate outputted graphics data.

Functional Unit 170 may comprise any programmable unit capable of executing compiled graphics programs or configuration control. Preferably, however, Functional Unit 170 is a raster analyzer. If Functional Unit 170 is a raster analyzer, it typically receives values for parameters such as color and depth for each pixel and performs near and far plane clipping and raster operations, such as stencil and z testing to produce RGBA values for each pixel. The graphics data output by Functional Unit 170 is stored to shared memory. If Functional Unit 170 is a raster analyzer, Functional Unit 170 outputs final RGBA values for an image to be shown on Display 175. If no additional functional units are used in Graphics Processor 125, Scanout 180 reads from the shared memory the graphics data output by Functional Unit 170. Scanout 180 delivers the received graphics data to Display 175.

Figure 2:
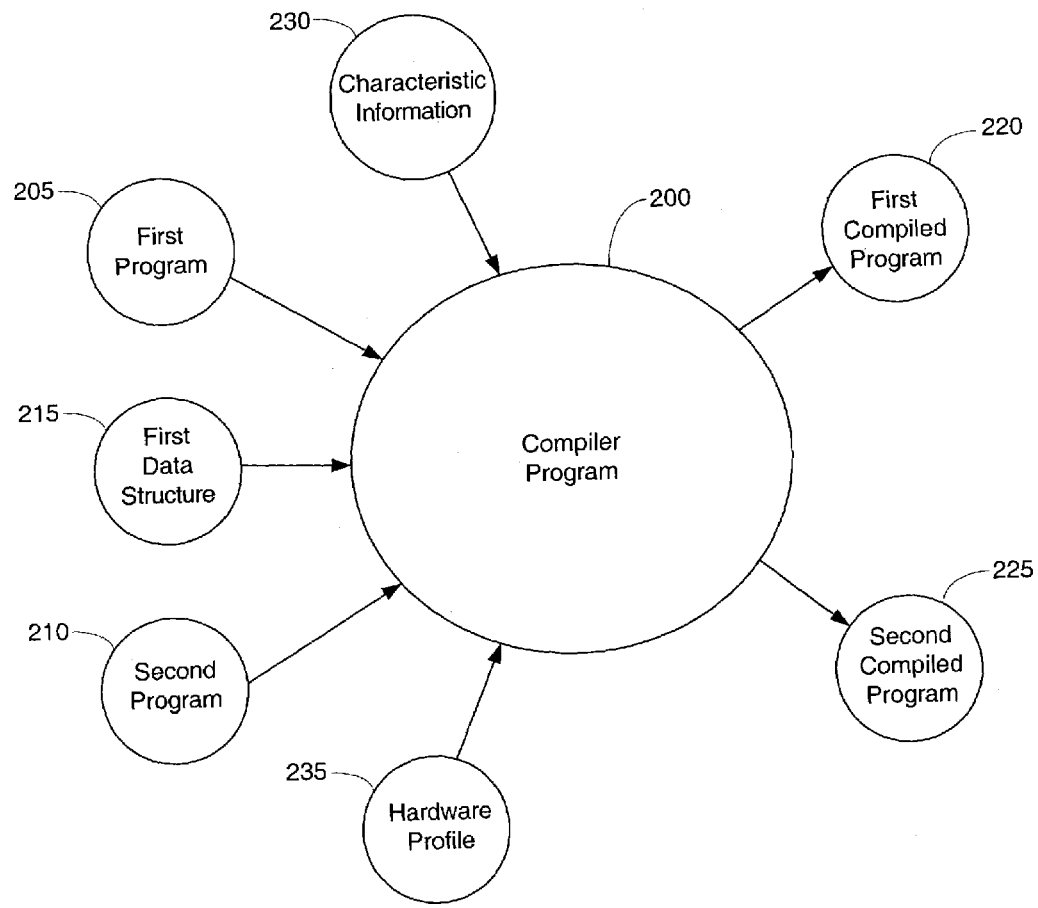
FIG. 2 shows a conceptual diagram of the inputs and outputs of a Compiler Program used in the present invention.

FIG. 2 shows a conceptual diagram of the inputs and outputs of a Compiler Program 200 configured to perform the method of the present invention. In accordance with the present invention, Compiler Program 200 may comprise a computer program product having a computer readable medium that includes computer program instructions configured to perform the method of the present invention. In relation to FIG. 1, Compiler Program 200 executes on Host CPU 114 and receives as input a First Graphics Program Module 205 and a Second Graphics Program Module 210 stored in a memory device coupled to Host CPU 114 (e.g., Host Memory 112 or Local Memory 135). First Graphics Program Module 205 and Second Graphics Program Module 210 are each written to execute (in their compiled forms) on a particular Functional Unit 140, 150, 160, or 170 of Graphics Processor 125. However, it is noted that First Graphics Program Module 205 can also be the host application written to execute on Host CPU 114.

First Graphics Program Module 205 is configured to output at least one parameter of graphics data referenced by a first graphics program module identifier. Second Graphics Program Module 210 is configured to input, from First Graphics Program Module 205, at least one parameter of graphics data by referencing at least one second graphics program module identifier. A second graphics program module identifier referencing an inputted parameter of graphics data has a corresponding and identical first graphics program module identifier in First Graphics Program Module 205 that references the same parameter of graphics data. Compiler Program 200 compiles the inputted First Graphics Program Module 205 and Second Graphics Program Module 210 to produce a First Compiled Graphics Program 220 and a Second Compiled Graphics Program 225, respectively.

Compiler Program 200 also receives as input a First Data Structure 215 stored in a memory device coupled to Host CPU 114 (e.g., Host Memory 112 or Local Memory 135). First Data Structure 215 contains a list of first data structure identifiers in a pre-defined order where at least one of the first data structure identifiers has a corresponding and identical first graphics program module identifier in First Graphics Program Module 205 and a corresponding and identical second graphics program module identifier in Second Graphics Program Module 210. Therefore, First Data Structure 215 is configured to interface First Graphics Program Module 205 to Second Graphics Program Module 210. First Data Structure 215 is used by Compiler Program 200 to identify memory locations in the shared memory (e.g., Local Memory 135) for the first data structure identifiers based on the pre-defined order of the first data structure identifiers.

In an alternate embodiment, Compiler Program 200 also receives as input Characteristic Information 230 about the shared memory stored in a memory device coupled to Host CPU 114 (e.g., Host Memory 112 or Local Memory 135). Characteristic Information 230 about the shared memory includes, for example, number of registers, size of registers, or access performance of memory locations. Characteristic Information 230 of the shared memory is also used by Compiler Program 200 to identify memory locations for the first data structure identifiers.

In a further embodiment, Compiler Program 200 also receives as input a Hardware Profile 235 stored in a memory device coupled to Host CPU 114 (e.g., Host Memory 112 or Local Memory 135). Hardware Profile 235 includes information describing capabilities of a Functional Unit 140, 150, 160, or 170 of Graphics Processor 125. For example, Hardware Profile 235 may include a data type compatible with Functional Unit 140, 150, 160, or 170 or a precision rating of Functional Unit 140, 150, 160, or 170. Alternatively, Hardware Profile 235 includes information describing a memory configuration of the shared memory such as information on the number of registers or size of registers. Information in Hardware Profile 235 is used by Compiler Program 200 to determine compatibility of resources required by First Data Structure 215 and resources described in Hardware Profile 235.

FIGS. 3A to 3C show examples of software code used in the present invention. FIGS. 3A to 3C are described in relation to FIG. 2. FIG. 3A shows First Graphics Program Module 205 containing exemplary software code. First Graphics Program Module 205 is inputted to Compiler Program 200 (FIG. 2) to produce First Compiled Graphics Program 220. First Graphics Program Module 205 contains software code that includes output identifiers (e.g., "position," "color," and "uv") that reference parameters (e.g., position coordinates (x,y,z), color, and texture coordinates (u,v), respectively) that are output by First Graphics Program Module 205. The output identifiers are also referred to as first graphics program module identifiers.

First Graphics Program Module 205 may also contain software code that includes, for example, an output data structure name (e.g., "myvf"), a program type (e.g., "vertexprogram"), a program name (e.g., "skinning"), and an input data structure name (e.g., "appdata"). The program type (e.g., "vertexprogram") identifies the general type of graphics program and the type of Functional Unit 140, 150, 160, or 170 (FIG. 1) on which First Graphics Program Module 205 is configured to execute. In the example shown in FIG. 3A, First Graphics Program Module 205 is a vertex type graphics program configured to execute on a vertex processor.

The output data structure name (e.g., "myvf") identifies the name of a data structure used to interface First Graphics Program Module 205 to a graphics program module where First Graphics Program Module 205 outputs graphics data to the graphics program module. In the example shown in FIG. 3A, the graphics program module receiving the graphics data output by First Graphics Program Module 205 is a Second Graphics Program Module 210 (see below). The input data structure name (e.g., "appdata") identifies the name of a data structure used to interface First Graphics Program Module 205 to a graphics program module where First Graphics Program Module 205 inputs graphics data from the graphics program module. In the example shown in FIG. 3A, First Graphics Program Module 205 receives graphics data from the host application currently executing on Host CPU 114 (FIG. 1).

FIG. 3B shows Second Graphics Program Module 210 containing exemplary software code. Second Graphics Program Module 210 is inputted to Compiler Program 200 (FIG. 2) to produce Second Compiled Graphics Program 225. Second Graphics Program Module 210 contains software code that includes input identifiers (e.g., "position," "color," and "uv") that reference parameters (e.g., position coordinates (x,y,z), color, and texture coordinates (u,v), respectively) that are input from First Graphics Program Module 205. The input identifiers are also referred to as second graphics program module identifiers. Note that the input identifiers "position," "color," and "uv" of Second Graphics Program Module 210 have corresponding and identical output identifiers "position," "color," and "uv," respectively, in First Graphics Program Module 205. Therefore, the parameters referenced by these common identifiers are output by First Graphics Program Module 205 and input to Second Graphics Program Module 210.

Second Graphics Program Module 210 may also contain software code that includes, for example, an output data structure name (e.g., "fragout"), a program type (e.g., "fragmentprogram"), a program name (e.g., "texture"), an input data structure name (e.g., "myvf"), and output identifiers (e.g., "COL" and "POS"). The program type (e.g., "fragmentprogram") identifies the general type of graphics program and the type of Functional Unit 140, 150, 160, and 170 (FIG. 1) on which Second Graphics Program Module 210 is configured to execute. In the example shown in FIG. 3B, Second Graphics Program Module 210 is a fragment type program configured to execute on a fragment processor.

The input data structure name (e.g., "myvf") identifies the name of a data structure used to interface Second Graphics Program Module 210 to a graphics program module where Second Graphics Program Module 210 inputs graphics data from the graphics program module. In the example shown in FIG. 3B, Second Graphics Program Module 210 receives inputted graphics data from First Graphics Program Module 205. The output data structure name (e.g., "fragout") identifies the name of a data structure used to interface Second Graphics Program Module 210 to a graphics program module where Second Graphics Program Module 210 outputs graphics data to the graphics program module. The output identifiers (e.g., "COL" and "POS") reference parameters that are output by Second Graphics Program Module 210.

FIG. 3C shows First Data Structure 215 that is inputted to Compiler Program 200 (FIG. 2) to interface First Graphics Program Module 205 to Second Graphics Program Module 210. First Data Structure 215 contains software code that includes a list of first data structure identifiers (e.g., "position," "color," and "uv") in a pre-defined order. In an alternative embodiment, a data type associated with each data structure identifier (e.g., "float2," "float2," and "float," respectively) is also included in First Data Structure 215. First Data Structure 215 may also contain software code that includes, for example, a type of data structure (e.g., "vertex2fragment") and a data structure name (e.g., "myvf"). The data structure name identifies the name of a data structure so it can be easily referenced in graphics program modules it is configured to interface. In this case, the data structure name (e.g., "myvf") is referenced by First Graphics Program Module 205 as an output data structure and referenced by Second Graphics Program Module 210 as an input data structure.

In a preferred embodiment, each data structure identifier of a data structure has a corresponding and identical identifier in each graphics program module the data structure is configured to interface. These identifiers that are common to the data structure and the graphics program modules it is configured to interface reference parameters that are output by a first graphics program module and input by a second graphics program module. In the examples shown in FIGS. 3A to 3C, the common identifiers "position," "color," and "uv" are output identifiers of First Graphics Program Module 205 and input identifiers of Second Graphics Program Module 210. The common identifiers reference the parameters of position coordinates, color, and uv coordinates that are output by First Graphics Program Module 205 and input by Second Graphics Program Module 210.

The data structure identifiers are listed in a pre-defined order that is used by Compiler Program 200 (FIG. 2) in determining memory locations in the shared memory (e.g., Internal Memory 137 of FIG. 1) for each data structure identifier. In an alternative embodiment, a data structure also includes a data type associated with each data structure identifier. The data type of a data structure identifier can also be used by Compiler Program 200 to identify a memory location in the shared memory. Data types may include data types such as float, half, int, fixed, bool, texobj, etc. A data type may be a standardized data type with a standardized data width (e.g., float has a standardized data width of 32 bits) or a user defined data type with a user defined data width (e.g., float2 can have a user defined data width of 16 bits). Therefore, given the data type of a data structure identifier, Compiler Program 200 can determine the data width of the data structure identifier. This information, in conjunction with Characteristic Information 230 (FIG. 2) about the shared memory (that is optionally inputted to Compiler Program 200), can be used by Compiler Program 200 to identify alternative memory locations for the data structure identifier in the shared memory (see below in relation to FIG. 3E).

The type of data structure ("vertex2fragment"), identifies the graphics program modules the data structure is configured to interface. A data structure and its list of data structure identifiers is based upon, in a general sense and a specific sense, the graphics program modules it is configured to interface. A data structure can be configured to interface a specific first graphics program module to a specific second graphics program module. In the examples shown in FIGS. 3A to 3C, First Data Structure 215 can be viewed as being configured to interface the specific software code found in First Graphics Program Module 205 to the specific software code found in Second Graphics Program Module 210.

Preferably, however, a data structure is predefined and configured to interface a first general type of graphics program module to a second general type of graphics program module (written to execute on a first general type of Functional Unit 140, 150, 160, or 170 and a second general type of Functional Unit 140, 150, 160, or 170, respectively). In other words, the contents of a data structure is preferably based on the graphics program modules it is configured to interface being of a particular type of graphics program module. Therefore, a data structure preferably contains a list of data structure identifiers used to reference parameters commonly passed between the types of graphics program modules the data structure is configured to interface. Assuming that the data structure identifiers used in the data structure give some indication of the parameter that is being referenced (e.g., position, color, etc.), a programmer can easily determine the parameters that are to be passed between the two types of graphics program modules by examining a single structure—the data structure. In the examples shown in FIGS. 3A to 3C, First Data Structure 215 can be viewed as being configured to interface vertex type graphics programs to fragment type graphics programs (written to execute on a vertex type processor and a fragment type processor, respectively) where the parameters of position coordinates, color, and uv coordinates are parameters commonly passed between vertex type graphics programs and fragment type graphics programs (and between vertex type processors and a fragment type processors).

Several data structures can be predefined and configured to interface graphics program modules of different types. In this way, a library of predefined data structures can be created so that a programmer can easily determine the parameters to be included in a graphics program module of a certain type. Therefore, if a programmer wishes to write a first type of graphics program module (e.g., vertex program) that outputs parameters to a second type of graphics program module (e.g., fragment program), the programmer can examine the predefined data structure (e.g., vertex2fragment data structure) used to interface the first and second types of graphics program modules to easily determine the parameters inputted to the second type of graphics program module. Therefore, the programmer can write the first type of graphics program module accordingly to output these parameters. Likewise, if a programmer wishes to write a second type of graphics program module (e.g., fragment program) that inputs parameters from a first type of graphics program module (e.g., vertex program), the programmer can examine the predefined data structure (e.g., vertex2fragment data structure) used to interface the first and second type of graphics program modules to easily determine the parameters outputted by the first type of graphics program module. Therefore, the programmer can write the second type of graphics program module accordingly to input these parameters.

In this way, a library of graphics program modules of a first general type (e.g., vertex programs) and a library of graphics program modules of a second general type (e.g., fragment programs) can be created where each graphics program module of the first general type can be interfaced with each graphics program module of the second general type. This allows full "mixing and matching" ability between graphics program modules of a first general type and graphics program modules of a second general type.

Preferably, there is a one-to-one correspondence between the data structure identifiers in First Data Structure 215, the first graphics program module identifiers (output identifiers) in First Graphics Program Module 205, and the second graphics program module identifiers (input identifiers) in Second Graphics Program Module 210. In other words, for each first data structure identifier in First Data Structure 215, there is a corresponding and identical first graphics program module identifier in First Graphics Program Module 205 and a corresponding and identical second graphics program module identifier in Second Graphics Program Module 210. Also, there is no additional first graphics program module identifier in First Graphics Program Module 205 or additional second graphics program module identifier in Second Graphics Program Module 210 that does not have a corresponding and identical data structure identifier in First Data Structure 215. In shorthand, this is referred to as a one-to-one correspondence between the identifiers of First Data Structure 215, First Graphics Program Module 205, and Second Graphics Program Module 210. Thus, in the preferred embodiment, there is also a one-to-one correspondence between the parameters output by First Graphics Program Module 205 and the parameters input to Second Graphics Program Module 210.

In an alternative embodiment, there is only a one-to-one correspondence between the data structure identifiers in First Data Structure 215 and either the first graphics program module identifiers in First Graphics Program Module 205 or the second graphics program module identifiers in Second Graphics Program Module 210. In a further embodiment, there is no one-to-one correspondence between the data structure identifiers in First Data Structure 215 and either the first graphics program module identifiers in First Graphics Program Module 205 or the second graphics program module identifiers in Second Graphics Program Module 210.

In alternative and further embodiments, First Data Structure 215, First Graphics Program Module 205, or Second Graphics Program Module 210 may contain identifiers that are not common to all three. Such identifiers are referred to as extraneous or unused identifiers. In an alternative embodiment, an extraneous or unused identifier is optimized out of the First Data Structure 215, First Graphics Program Module 205, and/or Second Graphics Program Module 210 by Compiler Program 200 (see below in relation to FIG. 5).

FIG. 3D shows contents of memory locations in shared memory 360 resulting from software code shown in FIGS. 3A to 3C in a preferred embodiment. In the preferred embodiment, upon receiving First Data Structure 215, Compiler Program 200 (FIG. 2) identifies memory locations in shared memory 360 (e.g., Internal Memory 137 of FIG. 1) for each data structure identifier based on the predefined order of the data structure identifiers in First Data Structure 215.

In the example shown in FIG. 3C, the data structure identifier "position" is in a first position, the data structure identifier "color" is in a second position, and the data structure identifier "uv" is in a third position in the pre-defined order of data structure identifiers. Therefore, as shown in FIG. 3D, Compiler Program 200 identifies, in shared memory 360, a first memory location ("location 1") in a First Register 362 for the data structure identifier (e.g., "position") found in the first position, a second memory location ("location 2") in a Second Register 364 for the data structure identifier (e.g., "color") found in the second position, and a third memory location ("location 3") in a Third Register 366 for the data structure identifier (e.g., "uv") found in the third position in the pre-defined order of data structure identifiers.

Alternatively, a data type associated with each data structure identifier and Characteristic Information 230 (FIG. 2) about the shared memory 360 is also used by Compiler Program 200 to identify a memory location in the shared memory 360 for each data structure identifier. Assuming that Characteristic Information 230 includes a register size of the shared memory 360, it is possible for Compiler Program 200 to identify alternative memory locations for each data structure identifier.

For example, suppose First Data Structure 215 includes a user defined data type "float2" with a user defined data width of 16 bits and a standardized data type "float" with a standardized data width of 32 bits. If the shared memory 360 consists of a set of registers and the register size of the shared memory 360 is 32 bits (as specified in Characteristic Information 230), there are at least two ways Compiler Program can identify memory locations for each data structure identifier in First Data Structure 215.

In a first way, the memory location identified for each data structure identifier includes a different register number. In the example shown in FIG. 3D, the first memory location ("location 1") is in First Register 362, the second memory location ("location 2") is in Second Register 364, and the third memory location ("location 3") is in Third Register 366 of the shared memory 360. Therefore, each memory location can be identified by a different register number associated with the register 362, 364, or 366 in which the memory location is found. Because the register size of the shared memory 360 is 32 bits (as specified in Characteristic Information 230) and none of the data widths associated with the data structure identifiers exceeds 32 bits, this memory allocation scheme is possible.

In a second way, the memory locations identified for two data structure identifiers includes the same register number combined with different register offsets. FIG. 3E shows an example of an alternative shared memory 380 where the memory locations for the data structure identifiers "position" and "color" are both in a First Register 382. Therefore, the memory locations for the data structure identifiers "position" and "color" would include the same register number associated with First Register 382. This memory allocation scheme is possible because, in this example, the register size of the shared memory 380 is 32 bits and the data width associated with the data structure identifiers "position" and "color" are both 16 bits. The memory locations identified for the data structure identifiers "position" and "color" would also include a different register offset for each identifier (e.g., a register offset of 0 and 1 bytes, respectively).

Figure 4:
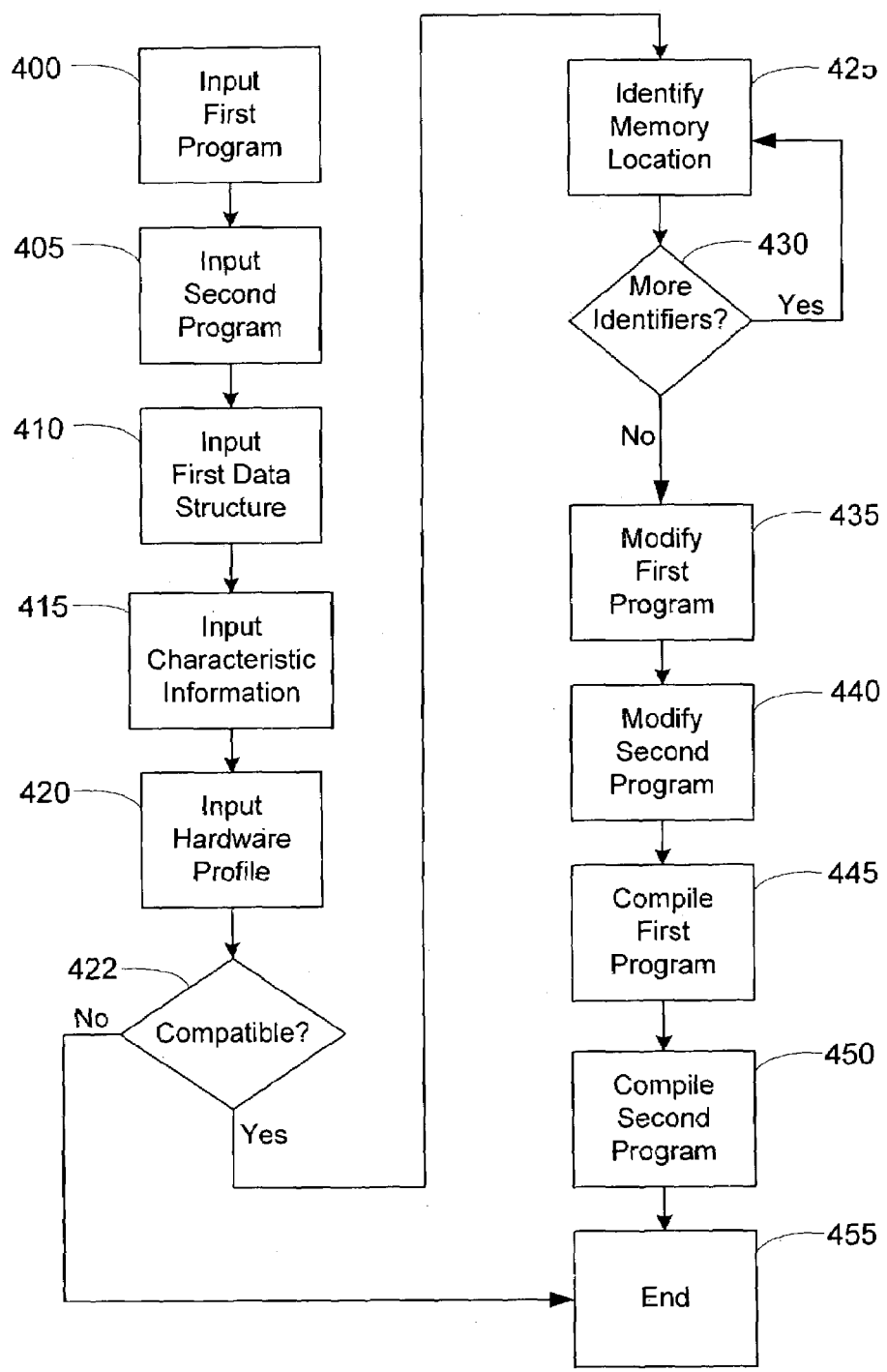
FIG. 4 shows a flowchart of a method for interfacing two graphics program modules in accordance with an embodiment of the present invention.

FIG. 4 shows a flowchart of one embodiment of a method for interfacing graphics program modules in accordance with the present invention. The graphics program modules are written to execute on a Functional Unit 140, 150, 160, and 170 of Graphics Processor 125 (FIG. 1) having a shared memory (e.g., Internal Memory 137 of FIG. 1). The graphics program modules are inputted to Compiler Program 200 (FIG. 2) executing on Host CPU 114 (FIG. 1) and processed and compiled by Compiler Program 200 according to a method described below.

As shown in FIG. 4, at step 400, First Graphics Program Module 205 (FIG. 2) is inputted to Compiler Program 200. The First Graphics Program Module 205 is configured to output at least one parameter of graphics data (e.g., position coordinates). Each outputted parameter is referenced in First Graphics Program Module 205 by an output identifier (first graphics program module identifier), e.g., "position".

At step 405, Second Graphics Program Module 210 (FIG. 2) is inputted to Compiler Program 200. Second Graphics Program Module 210 is configured to input at least one parameter of graphics data (e.g., position coordinates) from First Graphics Program Module 205. In Second Graphics Program Module 210, each inputted parameter is referenced by an input identifier (second graphics program module identifier), e.g., "position," that is identical to the output identifier (first graphics program module identifier) used to reference the same parameter in First Graphics Program Module 205.

At step 410, First Data Structure 215 (FIG. 2) configured to interface First Graphics Program Module 205 to Second Graphics Program Module 210 is inputted to Compiler Program 200 (FIG. 2). First Data Structure 215 includes, in a pre-defined order, a plurality of first data structure identifiers (e.g., position coordinates, color, and uv coordinates). In an alternative embodiment, First Data Structure 215 also includes a data type (e.g., float and float2) associated with each of the plurality of first data structure identifiers.

Preferably, there is a one-to-one correspondence (as discussed above in relation to FIG. 3C) between the data structure identifiers in First Data Structure 215, the output identifiers in First Graphics Program Module 205, and the input identifiers in Second Graphics Program Module 210. Alternatively, there is no one-to-one correspondence between the data structure identifiers in First Data Structure 215, the output identifiers in First Graphics Program Module 205, and the input identifiers in Second Graphics Program Module 210. In such a case, there are extraneous identifiers that may be optimized out of the First Data Structure 215, First Graphics Program Module 205, and/or Second Graphics Program Module 210 by Compiler Program 200 (see below in relation to FIG. 5).

In an alternative embodiment, at step 415, Characteristic Information 230 (FIG. 2) about the shared memory is inputted to Compiler Program 200. Characteristic Information 230 includes, for example, number of registers, size of registers, or access performance of memory locations. Characteristic Information 230 of the shared memory is used by Compiler Program to identify memory locations for the first data structure identifiers in step 425.

In a further embodiment, Hardware Profile 235 (FIG. 2) is inputted to Compiler Program 200 at step 420. Hardware Profile 235 includes information describing capabilities of Functional Unit 140, 150, 160, or 170 (FIG. 1) that First Graphics Program Module 205 or Second Graphics Program Module 210 is written to execute on. For example, Hardware Profile 235 may include a precision rating or a data type compatible with Functional Unit 140, 150, 160, or 170. The precision rating indicates the precision at which Functional Unit 140, 150, 160, or 170 operates (e.g., 32 bits). A compatible data type of Functional Unit 140, 150, 160, or 170 is a data type that Functional Unit 140, 150, 160, or 170 is capable of processing. Alternatively, Hardware Profile 235 includes information describing a memory configuration of the shared memory (e.g., Internal Memory 137 of FIG. 1) such as information on the number of registers or size of registers.

In the further embodiment, at step 422, Compiler Program 200 determines compatibility of resources required by First Data Structure 215 and resources described in Hardware Profile 235. Compiler Program 200 determines resources required by First Data Structure 215 using a data type associated with each first data structure identifier. From the data type associated with a first data structure identifier, Compiler Program 200 can also determine a data width associated with each first data structure identifier (as discussed above in relation to FIG. 3C). Compiler Program 200 then compares the resources required by First Data Structure 215 with resources described in Hardware Profile 235.

If Hardware Profile 235 includes a precision rating of Functional Unit 140, 150, 160, or 170, Compiler Program 200 compares the precision rating to the data widths associated with the first data structure identifiers. If any of the data widths associated with the first data structure identifiers exceeds the precision rating, Functional Unit 140, 150, 160, or 170 and First Data Structure 215 are determined to be incompatible. If Hardware Profile 235 includes a data type compatible with Functional Unit 140, 150, 160, or 170, Compiler Program 200 compares the compatible data type to the data types associated with the first data structure identifiers. If any of the data types associated with the first data structure identifiers does not match the compatible data type, Functional Unit 140, 150, 160, or 170 and First Data Structure 215 are determined to be incompatible.

As discussed above, in the preferred embodiment, there is a one-to-one correspondence between the identifiers of First Data Structure 215, First Graphics Program Module 205, and Second Graphics Program Module 210. Therefore, if Functional Unit 140, 150, 160, or 170 and First Data Structure 215 are incompatible, Functional Unit 140, 150, 160, or 170 is also incompatible with First Graphics Program Module 205 and Second Graphics Program Module 210 since the identifiers (and associated data types and data widths) in all three are identical. Therefore, neither First Graphics Program Module 205 nor Second Graphics Program Module 210 can execute (in their respective compiled forms) on Functional Unit 140, 150, 160, or 170. Therefore, when Compiler Program 200 determines that Functional Unit 140, 150, 160, or 170 and First Data Structure 215 are incompatible, it outputs an error message and ends processing at step 455. Otherwise, Compiler Program 200 continues processing at step 425.

In step 422, if Hardware Profile 235 includes a number of registers of the shared memory, Compiler Program 200 compares the number of first data structure identifiers to the number of registers. If the number of first data structure identifiers exceeds the number of registers, the shared memory and First Data Structure 215 are determined to be incompatible. If Hardware Profile 235 includes a size of registers of the shared memory, Compiler Program 200 compares the size of registers to the data widths associated with the first data structure identifiers. If any of the data widths associated with the first data structure identifiers exceeds the size of registers, the shared memory and First Data Structure 215 are determined to be incompatible. When Compiler Program 200 determines that the shared memory and First Data Structure 215 are incompatible, it outputs an error message and ends processing at step 455. Otherwise, Compiler Program 200 continues processing at step 425.

At step 425, Compiler Program 200 identifies a memory location in the shared memory for a first data structure identifier based on the position of the first data structure identifier in the pre-defined order of first data structure identifiers in First Data Structure 215. As discussed above, in the preferred embodiment, each first data structure identifier has a corresponding and identical output identifier (first graphics program module identifier) in First Data Structure 215 and a corresponding and identical input identifier (second graphics program module identifier) in Second Graphics Program Module 210.

In an alternative embodiment, Compiler Program 200 also uses Characteristic Information 230 (FIG. 2) of the shared memory along with the data type and data width associated with a first data structure identifier to identify the memory location of the first data structure identifier. Characteristic Information 230 (FIG. 2) of the shared memory may include such information as the number of registers, size of registers, or access performance of memory locations of the shared memory. The number of the registers is used by Compiler Program 200 to determine if first data structure identifiers exceeds the number of registers. If this were the case, Compiler Program 200 may identify memory locations for two or more first data structure identifiers on the same register using the data width associated with the data structure identifiers and the size of the registers in the shared memory (as discussed above in relation to FIG. 3E).

The access performance of memory locations can be used by Compiler Program 200 to identify memory locations with relatively high access performance for important or frequently referenced first data structure identifiers. For example, if the shared memory comprises both a memory resource internal to Graphics Processor 125 (with a relatively high access performance) and a memory resource external to Graphics Processor 125 (with a relatively low access performance), Compiler Program 200 can identify memory locations in the internal memory resource for more frequently referenced first data structure identifiers. Access performance of a memory location may relate to, for example, latency or the number of clock cycles needed to write to or read from a memory location.

If the shared memory comprises a set of registers, the memory location of a first data structure identifier can be identified by a register number. If Compiler Program 200 identifies memory locations for two or more first data structure identifiers on the same register, the memory location of the first data structure identifiers can be identified by a register number and a register offset. Examples of identification of memory locations in shared memory are discussed above in relation to FIGS. 3D and 3E.

After identifying a memory location for a first data structure identifier, at step 430, Compiler Program 200 determines if there is a further first data structure identifier in the predefined order of first data structure identifiers in First Data Structure 215. If there is a further first data structure identifier, the method returns to step 425 and Compiler Program 200 identifies a memory location for the further first data structure identifier. If there is not a further first data structure identifier, the method proceeds to step 435.

As discussed above, in the preferred embodiment, each first data structure identifier has a corresponding and identical output identifier (first graphics program module identifier) in First Data Structure 215 and a corresponding and identical input identifier (second graphics program module identifier) in Second Graphics Program Module 210. At step 435, Compiler Program 200 modifies First Graphics Program Module 205 by replacing a first graphics program module identifier in First Graphics Program Module 205 with the memory location identified for the corresponding and identical first data structure identifier in First Data Structure 215. As discussed above, a first graphics program module identifier references a parameter output by First Graphics Program Module 205. Therefore, Compiler Program 200, in effect, modifies First Graphics Program Module 205 to reference an outputted parameter by the memory location identified for the first data structure identifier that is identical to the first graphics program module identifier referencing the outputted parameter. Compiler Program 200 does so for each first graphics program module identifier in First Graphics Program Module 205. It is noted that, at step 435, Compiler Program 200 performs modifications to First Graphics Program Module 205 or to a stored version of First Graphics Program Module 205 stored in a memory device coupled to Host CPU 114 (e.g., Host Memory 112 or Local Memory 135).

At step 440, Compiler Program 200 modifies Second Graphics Program Module 210 by replacing a second graphics program module identifier in Second Graphics Program Module 210 with the memory location identified for the corresponding and identical first data structure identifier in First Data Structure 215. As discussed above, a second graphics program module identifier references a parameter input from First Graphics Program Module 205. Therefore, Compiler Program 200, in effect, modifies Second Graphics Program Module 210 to reference an inputted parameter by the memory location identified for the first data structure identifier that is identical to the second graphics program module identifier referencing the inputted parameter. Compiler Program 200 does so for each second graphics program module identifier in Second Graphics Program Module 210. It is noted that, at step 440, Compiler Program 200 performs modifications to Second Graphics Program Module 210 or to a stored version of Second Graphics Program Module 210 stored in Host Memory 112 or Local Memory 135.

When step 440 is completed, each first and second graphics program module identifier in First and Second Graphics Program Modules 205 and 210, respectively, is replaced with the memory location identified for the corresponding and identical first data structure identifier in First Data Structure 215. Therefore, each parameter input by Second Graphics Program Module 210 from First Graphics Program Module 205 is referenced in First Graphics Program Module 205 and Second Graphics Program Module 210 by the identified memory location. This allows for interfacing of First Graphics Program Module 205 to Second Graphics Program Module 210 because both First Graphics Program Module 205 and Second Graphics Program Module 210 reference the same parameters by the same memory locations.

At step 445, Compiler Program 200 compiles First Graphics Program Module 205 to produce First Compiled Graphics Program 220 (FIG. 2) executable on a particular Functional Unit 140, 150, 160, or 170 of Graphics Processor 125. At step 450, Compiler Program 200 compiles Second Graphics Program Module 210 to produce Second Compiled Graphics Program 225 (FIG. 2) executable on a particular Functional Unit 140, 150, 160, or 170 of Graphics Processor 125. When First Compiled Graphics Program 220 is executed on a particular Functional Unit 140, 150, 160, and 170, the particular Functional Unit 140, 150, 160, or 170 outputs graphical data to the shared memory. The outputted graphical data is then used by a particular Functional Unit 140, 150, 160, or 170 that executes Second Graphics Program Module 210. The method ends at step 455.

Figure 5:
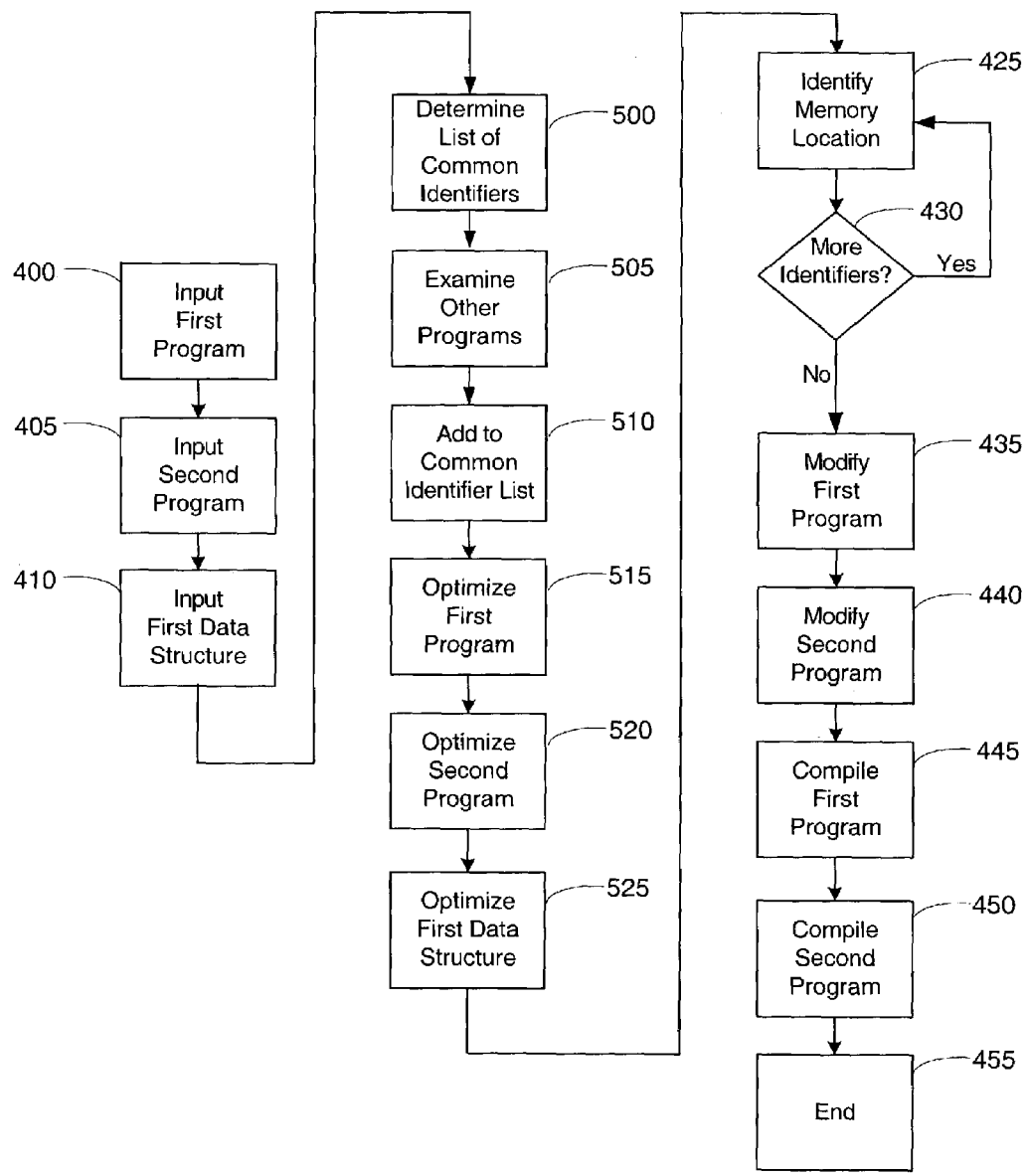
FIG. 5 shows a flowchart of a method for optimizing the interfacing of two graphics program modules shown in FIG. 4.

FIG. 5 shows a flowchart of a method for optimizing the interfacing of two graphics program modules shown in FIG. 4. Only those steps that are different from the steps shown in FIG. 4 will be discussed in detail. Optimization of software code in First Graphics Program Module 205, Second Graphics Program Module 210, and First Data Structure 215 may be performed in the alternative embodiment where there is no one-to-one correspondence between the data structure identifiers in First Data Structure 215, the first graphics program module identifiers in First Graphics Program Module 205, and the first graphics program module identifiers in Second Graphics Program Module 210.

As shown in FIG. 5, Compiler Program 200 receives First Graphics Program Module 205 (at step 400), Second Graphics Program Module 210 (step 405), and First Data Structure 215 (at step 410). At step 500, Compiler Program 200 examines First Graphics Program Module 205, Second Graphics Program Module, and First Data Structure 215 to determine a list of identifiers common to the first graphics program module identifier(s) of First Graphics Program Module 205, the second graphics program module identifier(s) of Second Graphics Program Module, and the first data structure identifiers of First Data Structure 215. Any identifier not placed on the list of common of identifiers is placed on a list of extraneous or unused identifiers.

An identifier on the list of extraneous identifiers indicates that the identifier references a parameter not output by First Graphics Program Module 205 and/or input by Second Graphics Program Module 210. For example, an identifier on the list of extraneous identifiers may indicate that a parameter is output by First Graphics Program Module 205 but not input by Second Graphics Program Module 210. Or, for example, an identifier on the list of extraneous identifiers may indicate that a parameter is input by Second Graphics Program Module 210 but not output by First Graphics Program Module 205. Therefore, a parameter referenced by an identifier on the list of extraneous identifiers is considered an extraneous or unused parameter. An identifier on the list of extraneous identifiers may be optimized out of the First Data Structure 215, First Graphics Program Module 205, and/or Second Graphics Program Module 210 using the method described herein.

In the situation where there is a one-to-one correspondence between the data structure identifiers in First Data Structure 215 and either the first graphics program module identifiers in First Graphics Program Module 205 or the second graphics program module identifiers in Second Graphics Program Module 210, Compiler Program 200 does not examine the graphics program module with which First Data Structure 215 has a one-to-one correspondence to determine the list of common of identifiers and the list of extraneous identifiers. For example, if there is a one-to-one correspondence between the data structure identifiers in First Data Structure 215 and the first graphics program module identifiers in First Graphics Program Module 205, Compiler Program 200 does not examine First Graphics Program Module 205 because each first graphics program module identifier is known to Compiler Program 200 through First Data Structure 215. However, in the situation where there is no one-to-one correspondence between First Data Structure 215 and either First Graphics Program Module 205 or Second Graphics Program Module 210, Compiler Program 200 must examine First Data Structure 215, First Graphics Program Module 205, and Second Graphics Program Module 210 to determine the list of common identifiers and the list of extraneous identifiers.

In an alternative embodiment, at step 505, Compiler Program 200 examines any additional graphics program modules received by Compiler Program 200 to potentially revise the list of common identifiers and the list of extraneous identifiers. At step 505, Compiler Program 200 compares the identifiers contained in the additional graphics program modules to the list of extraneous identifiers. At step 510, if an extraneous identifier on the list of extraneous identifiers is identical to any identifier contained in any additional graphics program module, the extraneous identifier is taken out of the list of extraneous identifiers and added to the list of common identifiers. In this way, Compiler Program 200 verifies that an identifier on the list of extraneous identifiers is not referencing a parameter used by any graphics program module received by Compiler Program 200.

At step 515, Compiler Program 200 optimizes First Graphics Program Module 205 by notating software code relating to any first graphics program module identifier on the list of extraneous identifiers. Alternatively, Compiler Program 200 optimizes First Graphics Program Module by notating software code relating to any first graphics program module identifier not on the list of common identifiers. The notated software code portions of First Graphics Program Module 205 are not to be compiled by Compiler Program 200 to produce First Compiled Graphics Program 220 (see step 445 below). Alternatively, Compiler Program 200 optimizes First Graphics Program Module 205 by removing software code in First Graphics Program Module 205 relating to any first graphics program module identifier on the list of extraneous identifiers. As a further embodiment, Compiler Program 200 optimizes First Graphics Program Module 205 by removing software code in First Graphics Program Module 205 relating to any first graphics program module identifier not on the list of common identifiers. Therefore, at step 515, Compiler Program 200 notates or removes a portion of First Graphics Program Module 205 that outputs an extraneous parameter referenced by an extraneous identifier. It is noted that, at step 515, Compiler Program 200 may notate or remove software code from First Graphics Program Module 205 or from a stored version of First Graphics Program Module 205 stored in a memory device coupled to Host CPU 114 (e.g., Host Memory 112 or Local Memory 135).

At step 520, Compiler Program 200 optimizes Second Graphics Program Module 210 by notating or removing software code relating to any second graphics program module identifier on the list of extraneous identifiers or not on the list of common identifiers applying the method described above in step 515. The notated software code portions of Second Graphics Program Module 210 are not to be compiled by Compiler Program 200 to produce Second Compiled Graphics Program 225 (see step 450 below). Therefore, at step 520, Compiler Program 200 notates or removes a portion of Second Graphics Program Module 210 that inputs an extraneous parameter referenced by an extraneous identifier. It is noted that, at step 520, Compiler Program 200 may notate or remove software code from Second Graphics Program Module 210 or from a stored version of Second Graphics Program Module 210 stored in a memory device coupled to Host CPU 114 (e.g., Host Memory 112 or Local Memory 135).

At step 525, Compiler Program 200 optimizes First Data Structure 215 by removing any software code relating to any first data structure identifier on the list of extraneous identifiers. Alternatively, Compiler Program 200 optimizes First Data Structure 215 by removing any software code relating to any first data structure identifier not on the list of common identifiers. It is noted that, at step 525, Compiler Program 200 may remove software code from First Data Structure 215 or from a stored version of First Data Structure 215 stored in a memory device coupled to Host CPU 114 (e.g., Host Memory 112 or Local Memory 135). In a further embodiment, Compiler Program 200 only optimizes First Graphics Program Module 205 at step 515, Second Graphics Program Module 210 at step 520, or First Data Structure 215 at step 525, or any combination of the three.

At steps 425 and 430, Compiler Program 200 identifies a memory location in the shared memory for each first data structure identifier in the pre-defined order of first data structure identifiers, according to the method described above in relation to FIG. 4. By removing any software code relating to any first data structure identifier on the list of extraneous identifiers in First Data Structure 215 in step 525, processing time for identifying a memory location for an extraneous identifier and memory space in the shared memory for an extraneous identifier is saved in step 425.

At step 445, Compiler Program 200 compiles First Graphics Program Module 205 to produce First Compiled Graphics Program 220 executable on a particular Functional Unit 140, 150, 160, or 170 of Graphics Processor 125. Any portions of First Graphics Program Module 205 notated in step 515, however, are not compiled to produce First Compiled Graphics Program 220. At step 450, Compiler Program 200 compiles Second Graphics Program Module 210 to produce and Second Compiled Graphics Program 225 executable on a particular Functional Unit 140, 150, 160, or 170 of Graphics Processor 125. Any portions of Second Graphics Program Module 210 notated in step 520, however, are not compiled to produce Second Compiled Graphics Program 225.

Because software code relating to any extraneous identifiers has been removed or marked for non-compiling in step 515 and/or step 520, processing time for compiling software code related to extraneous identifiers is saved in step 445 and/or step 450. Also, execution time of First Compiled Graphics Program 220 and/or Second Compiled Graphics Program 225 on Functional Unit 140, 150, 160, or 170 is also saved since software code relating to any extraneous identifiers is not executed.

The following are examples of the optimization method described above in relation to FIG. 5. Example 1: Suppose First Graphics Program Module 205 outputs a first parameter referenced by a first identifier and there is a one-to-one correspondence between the identifiers of First Graphics Program Module 205 and First Data Structure 215 (therefore First Data Structure 215 contains an identifier that is identical to the first identifier). Second Graphics Program Module 210, however, does not contain an identifier that is identical to the first identifier. At step 500, Compiler Program 200 examines First Data Structure 215 and Second Graphics Program Module 210 (it does not examine First Graphics Program Module 205 since it has a one-to-one correspondence with First Data Structure 215). The first identifier is then placed on the list of extraneous identifiers since it is not common to Second Graphics Program Module 210 (indicating that first identifier references a parameter not input by Second Graphics Program Module 210). At step 515, Compiler Program 200 optimizes First Graphics Program Module 205 by removing or notating any software code related to the first identifier. At step 445, any notated portions of First Graphics Program Module 205 are not compiled to produce First Compiled Graphics Program 220. In an alternative embodiment, at step 525, Compiler Program 200 also optimizes First Data Structure 215 by removing any software code related to a first data structure identifier that is identical to the first identifier.

Example 2: Suppose Second Graphics Program Module 210 inputs a first parameter referenced by a first identifier and there is a one-to-one correspondence between the identifiers of Second Graphics Program Module 210 and First Data Structure 215 (therefore First Data Structure 215 contains an identifier that is identical to the first identifier). First Graphics Program Module 205, however, does not contain an identifier that is identical to the first identifier. At step 500, Compiler Program 200 examines First Data Structure 215 and First Graphics Program Module 205 (it does not examine Second Graphics Program Module 210 since it has a one-to-one correspondence with First Data Structure 215). The first identifier is then placed on the list of extraneous identifiers since it is not common to First Graphics Program Module 205 (indicating that first identifier references a parameter not output by First Graphics Program Module 205). At step 515, Compiler Program 200 optimizes Second Graphics Program Module 210 by removing or notating any software code related to the first identifier. At step 450, any notated portions of Second Graphics Program Module 210 are not compiled to produce Second Compiled Graphics Program 225. In an alternative embodiment, at step 525, Compiler Program 200 also optimizes First Data Structure 215 by removing any software code related to a first data structure identifier that is identical to the first identifier.

Example 3: Suppose that First Data Structure 215 contains a first identifier and First Graphics Program Module 205 and Second Graphics Program Module 210 does not contain an identifier identical to the first identifier. At step 500, Compiler Program 200 examines First Data Structure 215, First Graphics Program Module 205, and Second Graphics Program Module 210 and places the first identifier on the list of extraneous identifiers since it is not referenced by First Graphics Program Module 205 or Second Graphics Program Module 210. At step 525, Compiler Program 200 optimizes First Data Structure 215 by removing any software code related to the first identifier.

Figure 6A:
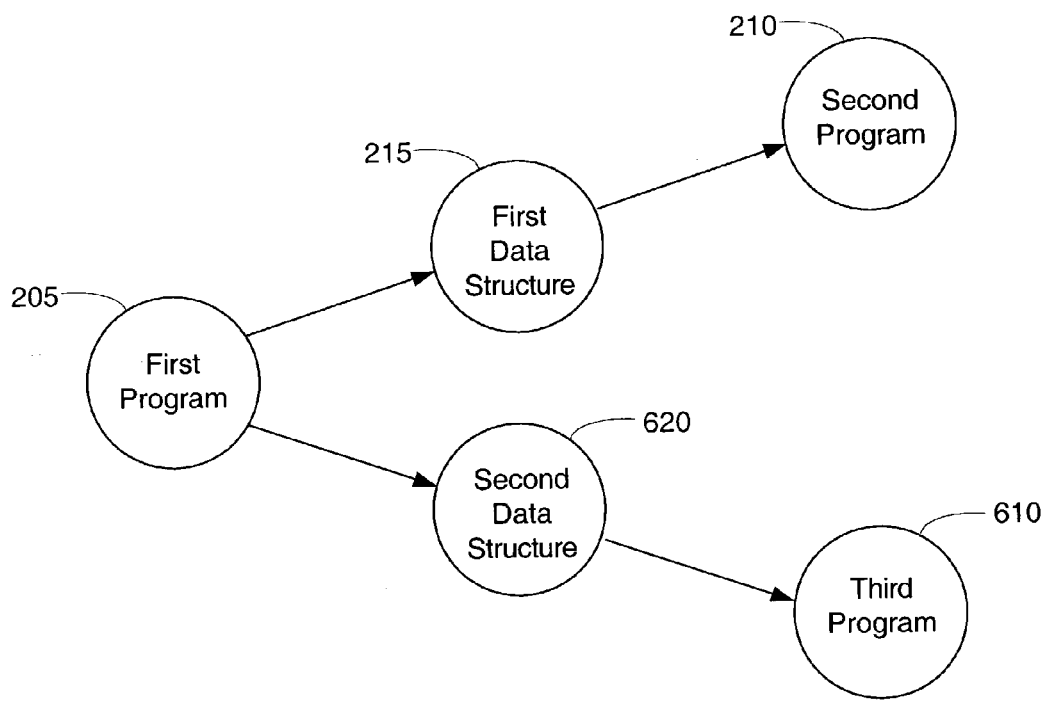
FIGS. 6A and 6B show conceptual diagrams of alternative embodiments including a Third Graphics Program Module and a Second Data Structure.
Figure 6B:
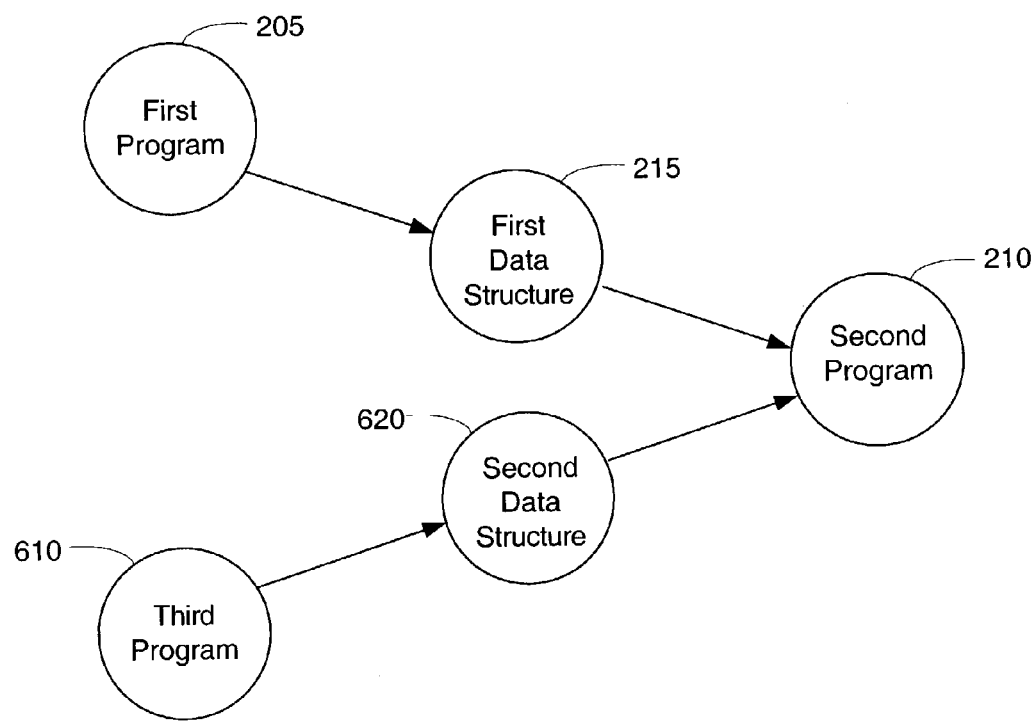

FIGS. 6A and 6B show conceptual diagrams of an alternative embodiment including a Third Graphics Program Module 610 and a Second Data Structure 620. Third Graphics Program Module 610 is stored in Host Memory 112 or Local Memory 135 and inputted to Compiler Program 200. Third Graphics Program Module 610 is configured to input or output at least one parameter of graphics data by referencing at least one third graphics program module identifier. Second Data Structure 620 is stored in Host Memory 112 or Local Memory 135 and also inputted to Compiler Program 200. Second Data Structure 620 contains a list of second data structure identifiers in a pre-defined order. Second Data Structure 620 is used by Compiler Program 200 to identify memory locations in the shared memory for the second data structure identifiers based on the pre-defined order of the second data structure identifiers (see below in relation to FIG. 7). FIGS. 6A and 6B are described in relation to FIGS. 1 and 2.

In the conceptual diagram shown in FIG. 6A, Second Graphics Program Module 210 and Third Graphics Program Module 610 each input at least one parameter of graphics data from First Graphics Program Module 205. A third graphics program module identifier referencing an inputted parameter of graphics data from First Graphics Program Module 205 has a corresponding and identical first graphics program module identifier in First Graphics Program Module 205 that references the same parameter of graphics data. Third Graphics Program Module 610 contains software code similar to the exemplary software code shown in FIG. 3B for Second Graphics Program Module 210. Third Graphics Program Module 610 contains software code that includes input identifiers (third graphics program module identifiers) and other software code, for example, an output data structure name, a program type, a program name, an input data structure name, and output identifiers.

First Data Structure 215 is configured to interface First Graphics Program Module 205 to Second Graphics Program Module 210 and Second Data Structure 620 is configured to interface First Graphics Program Module 205 to Third Graphics Program Module 610. In the preferred embodiment, each first data structure identifier in First Data Structure 215 has a corresponding and identical first graphics program module identifier in First Data Structure 215 and a corresponding and identical second graphics program module identifier in Second Graphics Program Module 210. Also, each second data structure identifier in Second Data Structure 620 has a corresponding and identical first graphics program module identifier in First Graphics Program Module 205 and a corresponding and identical third graphics program module identifier in Third Graphics Program Module 610.

In the conceptual diagram shown in FIG. 6B, Second Graphics Program Module 210 receives as input at least one parameter of graphics data from both First Graphics Program Module 205 and Third Graphics Program Module 610. A second graphics program module identifier referencing an inputted parameter of graphics data from Third Graphics Program Module 610 has a corresponding and identical third graphics program module identifier in Third Graphics Program Module 610 that references the same parameter of graphics data. Third Graphics Program Module 610 contains software code similar to the exemplary software code shown in FIG. 3A for First Graphics Program Module 205. Third Graphics Program Module 610 contains software code that includes output identifiers (third graphics program module identifiers) and other software code, for example, an output data structure name, a program type, a program name, and an input data structure name.

First Data Structure 215 is configured to interface First Graphics Program Module 205 to Second Graphics Program Module 210 and Second Data Structure 620 is configured to interface Third Graphics Program Module 610 to Second Graphics Program Module 210. In the preferred embodiment, each first data structure identifier in First Data Structure 215 has a corresponding and identical first graphics program module identifier in First Data Structure 215 and a corresponding and identical second graphics program module identifier in Second Graphics Program Module 210. Also, each second data structure identifier in Second Data Structure 620 has a corresponding and identical second graphics program module identifier in Second Graphics Program Module 210 and a corresponding and identical third graphics program module identifier in Third Graphics Program Module 610.

Figure 7:
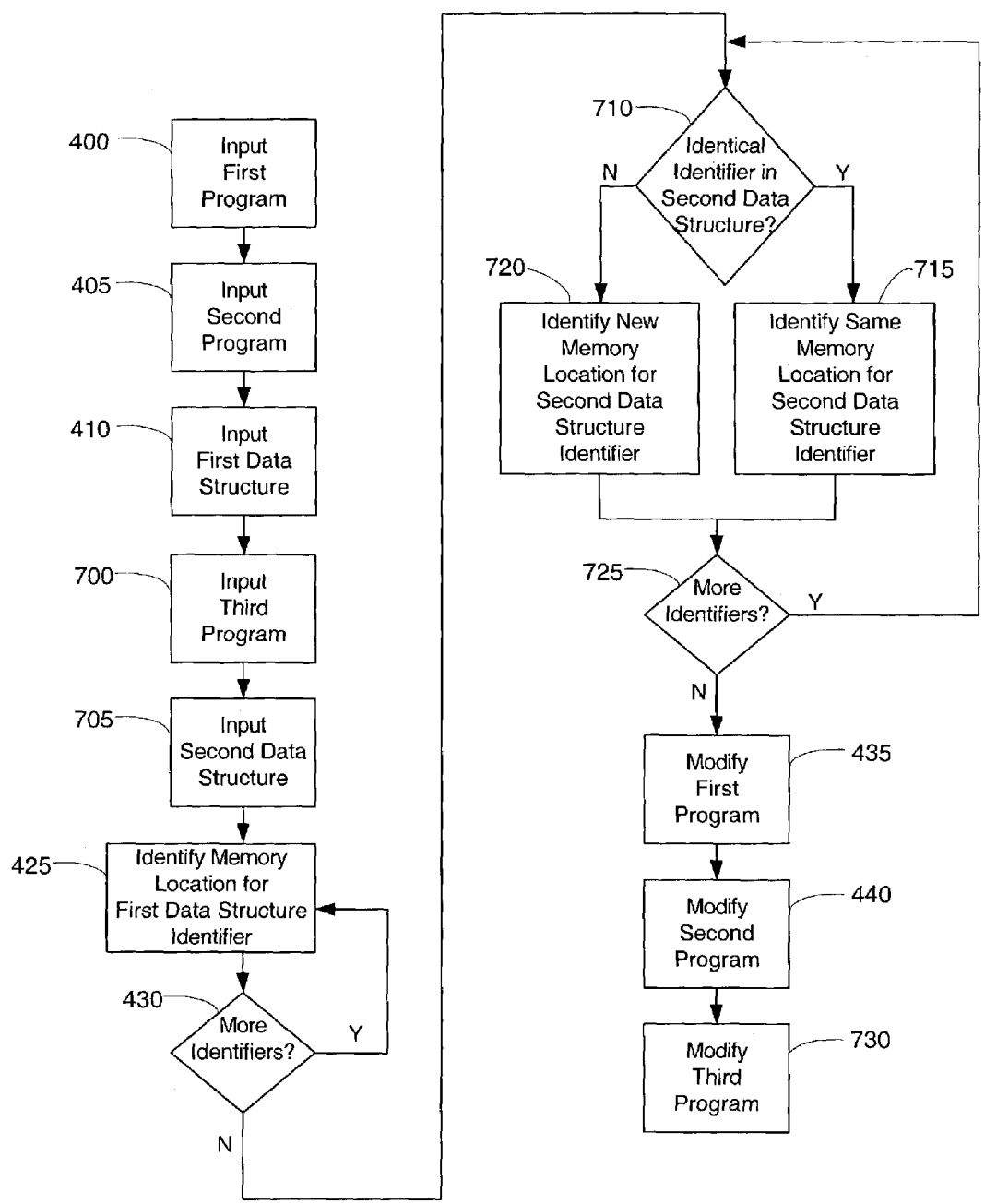
FIG. 7 shows a flowchart of one embodiment of a method for interfacing the graphics program modules shown in FIGS. 6A and 6B.

FIG. 7 shows a flowchart of one embodiment of a method for interfacing the graphics program modules shown in FIGS. 6A and 6B. Only those steps that are different from the steps shown in FIG. 4 will be discussed in detail.

At step 700, Third Graphics Program Module 610 is inputted to Compiler Program 200 (FIG. 2). If the conceptual diagram shown in FIG. 6A is followed, Third Graphics Program Module 610 is configured to input at least one parameter of graphics data from First Graphics Program Module 205. In Third Graphics Program Module 610, each inputted parameter is referenced by an input identifier (third graphics program module identifier) that is identical to the output identifier (first graphics program module identifier) used to reference the same parameter in First Graphics Program Module 205. If the conceptual diagram shown in FIG. 6B is followed, Third Graphics Program Module 610 is configured to output at least one parameter of graphics data to Second Graphics Program Module 210. In Third Graphics Program Module 610, each outputted parameter is referenced by an output identifier (third graphics program module identifier) that is identical to the input identifier (second graphics program module identifier) used to reference the same parameter in Second Graphics Program Module 210.

At step 705, Second Data Structure 620 is inputted to Compiler Program 200. If the conceptual diagram shown in FIG. 6A is followed, Second Data Structure 620 is configured to interface First Graphics Program Module 205 to Third Graphics Program Module 610. If the conceptual diagram shown in FIG. 6B is followed, Second Data Structure 620 is configured to interface Second Data Structure 620 to Third Graphics Program Module 610. For both conceptual diagrams shown in FIGS. 6A and 6B, Second Data Structure 620 includes, in a pre-defined order, a plurality of second data structure identifiers.

At steps 425 and 430, Compiler Program 200 identifies a memory location in the shared memory for each first data structure identifier based on the position of the first data structure identifier in the pre-defined order of first data structure identifiers in First Data Structure 215. As discussed above, in a preferred embodiment, each first data structure identifier has a corresponding and identical first graphics program module identifier in First Data Structure 215 and a corresponding and identical second graphics program module identifier in Second Graphics Program Module 210.

At step 710, Compiler Program 200 determines if a second data structure identifier in Second Data Structure 620 is identical to any first data structure identifier in First Data Structure 215. In this way, Compiler Program 200 also determines if a second data structure identifier is identical to any first graphics program module identifier in First Data Structure 215 and any second graphics program module identifier in Second Graphics Program Module 210 due to the one-to-one correspondence between the first data structure identifiers and first graphics program module identifiers and the one-to-one correspondence between the first data structure identifiers and second graphics program module identifiers.

If Compiler Program 200 determines that a second data structure identifier is identical to any first data structure identifier, at step 715, Compiler Program 200 identifies a memory location in the shared memory for the second data structure identifier that is the same as the memory location identified in step 425 for the identical first data structure identifier. Therefore, the same memory location is identified for identical first and second data structure identifiers.

If Compiler Program 200 determines that a second data structure identifier is not identical to any first data structure identifier, at step 720, Compiler Program 200 identifies a new memory location in the shared memory for the second data structure identifier. Compiler Program 200 identifies a memory location in the shared memory for the second data structure identifier based on the position of the second data structure identifier in the pre-defined order of the second data structure identifiers in Second Data Structure 620.

After identifying a memory location for a second data structure identifier, at step 725, Compiler Program 200 determines if there is a further second data structure identifier in the pre-defined order of second data structure identifiers in Second Data Structure 620. If there is a further second data structure identifier, the method returns to step 710 where Compiler Program 200 determines if the further second data structure identifier is identical to any first data structure identifier in First Data Structure 215. If Compiler Program 200 determines that there is not a further second data structure identifier, the method proceeds to step 435.

If the conceptual diagram shown in FIG. 6A is followed, at step 435, Compiler Program 200 replaces each first graphics program module identifier in First Graphics Program Module 205 with the memory location identified for the corresponding and identical first data structure identifier in First Data Structure 215 or the corresponding and identical second data structure identifier in Second Data Structure 620. At step 440, Compiler Program 200 performs modifications to Second Graphics Program Module 210 as described above in relation to FIG. 4. At step 730, Compiler Program 200 replaces each third graphics program module identifier in Third Graphics Program Module 610 with the memory location identified for the corresponding and identical second data structure identifier in Second Data Structure 620. In Third Graphics Program Module 610, each inputted parameter is referenced by a third graphics program module identifier. Therefore, Compiler Program 200, in effect, modifies Third Graphics Program Module 610 to reference each inputted parameter by the memory location identified for the second data structure identifier that is identical to the third graphics program module identifier referencing the inputted parameter.

If the conceptual diagram shown in FIG. 6B is followed, at step 435, Compiler Program 200 performs modifications to First Graphics Program Module 205 as described above in relation to FIG. 4. At step 440, Compiler Program 200 replaces each second graphics program module identifier in Second Graphics Program Module 210 with the memory location identified for the corresponding and identical first data structure identifier in First Data Structure 215 or the corresponding and identical second data structure identifier in Second Data Structure 620. At step 730, Compiler Program 200 replaces each third graphics program module identifier in Third Graphics Program Module 610 with the memory location identified for the corresponding and identical second data structure identifier in Second Data Structure 620. In Third Graphics Program Module 610, each outputted parameter is referenced by a third graphics program module identifier. Therefore, Compiler Program 200, in effect, modifies Third Graphics Program Module 610 to reference each outputted parameter by the memory location identified for the second data structure identifier that is identical to the third graphics program module identifier referencing the outputted parameter.

The invention has been described above with reference to specific embodiments. It will, however, be evident that various modifications and changes may be made thereto without departing from the broader spirit and scope of the invention as set forth in the appended claims. The foregoing description and drawings are, accordingly, to be regarded in an illustrative rather than a restrictive sense. The listing of steps in method claims do not imply performing the steps in any particular order, unless explicitly stated in the claim.

The invention claimed is:

1. A method for interfacing a plurality of graphics program modules written to execute on a plurality of functional units of a graphics processor using a shared memory, comprising the steps of:
inputting a first graphics program module configured to output a first parameter referenced by a first graphics program module identifier;
inputting a second graphics program module configured to input the first parameter by referencing the first graphics program module identifier;
inputting a first data structure that includes, in a pre-defined order, a plurality of first data structure identifiers;
identifying a memory location in the shared memory, based on the pre-defined order of the first data structure identifiers, for one of the plurality of first data structure identifiers that is the same as the first graphics program module identifier;
modifying the first and second graphics program modules to reference the first parameter by the identified memory location; and
displaying the output of the second graphics program module on a display device.

2. The method of claim 1 wherein the first data structure includes, in a pre-defined order, a data type associated with each of the plurality of first data structure identifiers.

3. The method of claim 2 further comprising:
inputting information about characteristics of the shared memory, and
wherein the identifying step comprises identifying the memory location based on the information about the characteristics of the shared memory.

4. The method of claim 3 wherein the information about the characteristics of the shared memory include number of registers, size of registers, or access performance of memory locations.

5. The method of claim 1 wherein the plurality of first data structure identifiers is based upon the first graphics program module being a first type of graphics program module and the second graphics program module being a second type of graphics program module.

6. The method of claim 1 wherein the plurality of first data structure identifiers is based upon the first graphics program module being a vertex program and the second graphics program module being a fragment program.

7. The method of claim 1 wherein the shared memory is internal to the graphics processor.

8. The method of claim 7 wherein the shared memory is a set of registers.

9. The method of claim 1 wherein the shared memory is external to the graphics processor.

10. The method of claim 9 wherein the shared memory is a random access memory.

11. The method of claim 1 wherein the shared memory comprises a memory resource internal to the graphics processor and a memory resource external to the graphics processor.

12. The method of claim 1 further comprising:
transmitting configuration control to one functional unit among the plurality of functional units, wherein the configuration control configures the one functional unit to apply a transformation to the first parameter output by the first graphics program module.

13. The method of claim 12 wherein the one functional unit is configured to operate in a point mode, a line mode, or a triangle mode.

14. The method of claim 12 wherein the one functional unit is configured to produce linear interpolation, flat-shaded interpolation, or perspective-correct interpolation.

15. The method of claim 12 wherein the one functional unit is a rasterizer unit.

16. The method of claim 2 further comprising:
receiving a hardware profile describing capabilities of one functional unit of the plurality of functional units;
determining resources required by the first data structure; and
comparing the required resources with the capabilities of the one functional unit.

17. The method of claim 16 wherein the capabilities include a data type compatible with the one functional unit.

18. The method of claim 16 wherein the capabilities include a precision rating of the one functional unit.

19. The method of claim 2 further comprising:
receiving a hardware profile describing a memory configuration of the shared memory;
determining resources required by the first data structure; and
comparing the required resources with the memory configuration.

20. The method of claim 19 wherein the memory configuration includes a number of registers.

21. The method of claim 19 wherein the memory configuration includes a register size.

22. The method of claim 1 wherein the first graphics program module is further configured to output an additional parameter referenced by an additional first graphics program module identifier, the method further comprising, before the identifying step:
determining that the second graphics program module does not input the additional parameter by referencing the additional first graphics program module identifier.

23. The method of claim 22 further comprising:
notating a portion of the first graphics program module outputting the additional parameter;
compiling the first graphics program module except for the notated portion of the first graphics program module; and
compiling the second graphics program module.

24. The method of claim 22 further comprising:
removing a portion of the first graphics program module outputting the additional parameter;
compiling the first graphics program module; and
compiling the second graphics program module.

25. The method of claim 22 wherein the first data structure further includes a first data structure identifier among the plurality of first data structure identifiers that is the same as the additional first graphics program module identifier, the method further comprising, before the identifying step:
removing the first data structure identifier that is the same as the additional first graphics program module identifier from the first data structure.

26. The method of claim 22 further comprising, after the determining step:
verifying that the additional parameter is not referenced by the additional first graphics program module identifier in any graphics program module in the plurality of graphics program modules.

27. The method of claim 1 wherein the second graphics program module is further configured to input an additional parameter by referencing a second graphics program module identifier, the method further comprising, before the identifying step:
determining that the first graphics program module does not output the additional parameter referenced by the second graphics program module identifier.

28. The method of claim 27 further comprising:
notating a portion of the second graphics program module inputting the additional parameter;
compiling the first graphics program module; and
compiling the second graphics program module except for the notated portion of the second graphics program module.

29. The method of claim 27 further comprising:
removing a portion of the second graphics program module inputting the additional parameter;
compiling the first graphics program module; and
compiling the second graphics program module.

30. The method of claim 27 wherein the first data structure further includes a first data structure identifier among the plurality of first data structure identifiers that is the same as the second graphics program module identifier, the method further comprising, before the identifying step:
removing the first data structure identifier that is the same as the second graphics program module identifier from the first data structure.

31. The method of claim 1 wherein the first data structure further includes an unused first data structure identifier among the plurality of first data structure identifiers, the method further comprising, before the identifying step:
determining that the first graphics program module does not reference the unused first data structure identifier; and
removing the unused first data structure identifier from the first data structure.

32. The method of claim 1 further comprising:
inputting a third graphics program module configured to input the first parameter by referencing the first graphics program module identifier;
inputting a second data structure that includes, in a pre-defined order, a plurality of second data structure identifiers;
determining that one of the plurality of second data structure identifiers is the same as the first graphics program module identifier; and
modifying the third graphics program module to reference the first parameter by the identified memory location.

33. The method of claim 1, wherein the first graphics program module is further configured to output an additional parameter referenced by an additional first graphics program module identifier, the method further comprising:
inputting a third graphics program module configured to input the additional parameter by referencing the additional first graphics program module identifier;
inputting a second data structure that includes, in a pre-defined order, a plurality of second data structure identifiers;
identifying an additional memory location in the shared memory, based on the pre-defined order of the second data structure identifiers, for one of the plurality of second data structure identifiers that is the same as the additional first graphics program module identifier; and
modifying the first and third graphics program modules to reference the additional parameter by the additional identified memory location.

34. The method of claim 1 further comprising:
inputting a third graphics program module configured to output the first parameter referenced by the first graphics program module identifier;
inputting a second data structure that includes, in a pre-defined order, a plurality of second data structure identifiers;
determining that one of the plurality of second data structure identifiers is the same as the first graphics program module identifier; and
modifying the third graphics program module to reference the first parameter by the identified memory location.

35. The method of claim 1 further comprising:
inputting a third graphics program module configured to output an additional parameter referenced by a third graphics program module identifier, the second graphics program module being further configured to input the additional parameter by referencing the third graphics program module identifier;
inputting a second data structure that includes, in a pre-defined order, a plurality of second data structure identifiers;
identifying an additional memory location in the shared memory, based on the pre-defined order of the second data structure identifiers, for one of the plurality of second data structure identifiers that is the same as the third graphics program module identifier; and
modifying the second and third graphics program modules to reference the additional parameter by the additional identified memory location.

36. A system for interfacing a plurality of graphics program modules written to execute on a plurality of functional units of a graphics processor, comprising:
a shared memory;
a memory device containing:
a first graphics program module configured to output a first parameter referenced by a first graphics program module identifier, a second graphics program module configured to input the first parameter by referencing the first graphics program module identifier, and a first data structure that includes, in a pre-defined order, a plurality of first data structure identifiers; and
a central processing unit (CPU) coupled to the shared memory and the memory device, wherein the CPU:
receives the first graphics program module from the memory device, receives the second graphics program module from the memory device, receives the first data structure from the memory device, identifies a memory location in the shared memory, based on the pre-defined order of the first data structure identifiers, for one of the plurality of first data structure identifiers that is the same as the first graphics program module identifier, and
modifies the first and second graphics program modules to reference the first parameter by the identified memory location.

37. The system of claim 36 wherein the first data structure includes, in a pre-defined order, a data type associated with each of the plurality of first data structure identifiers.

38. The system of claim 37 wherein:
the memory device further contains information about characteristics of the shared memory; and
the CPU
receives information about characteristics of the shared memory from the memory device, and
identifies the memory location based on the information about the characteristics of the shared memory.

39. The system of claim 38 wherein the information about the characteristics of the shared memory include number of registers, size of registers, or access performance of memory locations.

40. The system of claim 36 wherein the plurality of first data structure identifiers is based upon the first graphics program module being a first type of graphics program module and the second graphics program module being a second type of graphics program module.

41. The system of claim 36, wherein the CPU further compiles the first graphics program module to produce a first compiled graphics program and compiles the second graphics program module to produce a second compiled graphics program, the system further comprising:
a first functional unit coupled to the CPU for receiving and executing the first compiled graphics program; and
a second functional unit coupled to the CPU for receiving and executing the second compiled graphics program.

42. The system of claim 41 wherein:
the first functional unit is a vertex processor;
the second functional unit is a fragment processor; and
the plurality of first data structure identifiers is based upon the first graphics program module being a vertex program and the second graphics program module being a fragment program.

43. The system of claim 36 wherein the shared memory is internal to the graphics processor.

44. The system of claim 43 wherein the shared memory is a set of registers.

45. The system of claim 36 wherein the shared memory is external to the graphics processor.

46. The system of claim 45 wherein the shared memory is a random access.

47. The system of claim 36 wherein the shared memory comprises a memory resource internal to the graphics processor and a memory resource external to the graphics processor.

48. The system of claim 36 wherein one functional unit among the plurality of function units receives configuration control for configuring the one functional unit to apply a transformation to the first parameter output by the first graphics program module.

49. The system of claim 48 wherein the one functional unit is configured to operate in a point mode, a line mode, or a triangle mode.

50. The system of claim 48 wherein the one functional unit is configured to produce linear interpolation, flat-shaded interpolation, or perspective-correct interpolation.

51. The system of claim 48 wherein the one functional unit is a rasterizer unit.

52. The system of claim 37 wherein:
the memory device further contains a hardware profile describing capabilities of one functional unit of the plurality of functional units; and
the CPU
receives the hardware profile from the memory device, determines resources required by the first data structure, and compares the required resources with the capabilities of the one functional unit.

53. The system of claim 52 wherein the capabilities include a data type compatible with the one functional unit.

54. The system of claim 52 wherein the capabilities include a precision rating of the one functional unit.

55. The system of claim 37 wherein:
the memory device further contains a hardware profile describing a memory configuration of the shared memory; and
the CPU
receives the hardware profile from the memory device, determines resources required by the first data structure, and compares the required resources with the capabilities of the one functional unit.

56. The system of claim 55 wherein the memory configuration includes a number of registers.

57. The system of claim 55 wherein the memory configuration includes a register size.

58. The system of claim 36 wherein:
the first graphics program module is further configured to output an additional parameter referenced by an additional first graphics program module identifier; and
the CPU determines that the second graphics program module does not input the additional parameter by referencing the additional first graphics program module identifier.

59. The system of claim 58 wherein the CPU:
notates a portion of the first graphics program module outputting the additional parameter,
compiles the first graphics program module except for the notated portion of the first graphics program module, and
compiles the second graphics program module.

60. The system of claim 58 wherein the CPU:
removes a portion of the first graphics program module outputting the additional parameter,
compiles the first graphics program module, and
compiles the second graphics program module.

61. The system of claim 58 wherein:
the first data structure further includes a first data structure identifier among the plurality of first data structure identifiers that is the same as the additional first graphics program module identifier; and
The CPU removes the first data structure identifier that is the same as the additional first graphics program module identifier from the first data structure.

62. The system of claim 58 wherein the CPU:
verifies that the additional parameter is not referenced by the additional first graphics program module identifier in any graphics program module in the plurality of graphics program modules.

63. The system of claim 36 wherein:
the second graphics program module is further configured to input an additional parameter by referencing a second graphics program module identifier; and
the CPU determines that the first graphics program module does not output the additional parameter referenced by the second graphics program module identifier.

64. The system of claim 63 wherein the CPU:
notates a portion of the second graphics program module inputting the additional parameter,
compiles the first graphics program module, and
compiles the second graphics program module except for the notated portion of the second program module.

65. The system of claim 63 wherein the CPU:
removes a portion of the second graphics program module inputting the additional parameter,
compiles the first graphics program module, and
compiles the second graphics program module.

66. The system of claim 63 wherein:
the first data structure further includes a first data structure identifier among the plurality of first data structure identifiers that is the same as the second graphics program module identifier; and
the CPU removes the first data structure identifier that is the same as the second graphics program module identifier from the first data structure.

67. The system of claim 36 wherein:
the first data structure further includes an unused first data structure identifier among the plurality of first data structure identifiers; and
the CPU
determines that the first graphics program module does not reference the unused first data structure identifier, and removes the unused first data structure identifier from the first data structure.

68. The system of claim 36 wherein:
the memory device further contains:
a third graphics program module configured to input the first parameter by referencing the first graphics program module identifier, and
a second data structure that includes, in a pre-defined order, a plurality of a second data structure identifiers; and
the CPU
receives the third graphics program module from the memory device, receives the second data structure from the memory device, determines that one of the plurality of second data structure identifiers is the same as the first graphics program module identifier, and
modifies the third graphics program module to reference the first parameter by the identified memory location.

69. The system of claim 36 wherein:
the first graphics program module is further configured to output an additional parameter referenced by an additional first graphics program module identifier;

the memory device further contains
- a third graphics program module configured to input the additional parameter by referencing the additional first graphics program module identifier, and
- a second data structure that includes, in a pre-defined order, a plurality of second data structure identifiers; and the CPU
- receives the third graphics program module from the memory device, receives the second data structure from the memory device, identifies an additional memory location in the shared memory, base don the pre-defined order of the second data structure identifiers, for one of the plurality of second data structure identifiers that is the same as the additional first graphics program module identifier, and
- modifies the first and third graphics program modules to reference the additional parameter by the additional identified memory location.

70. The system of claim 36 wherein:
the memory device further contains
- a third graphics program module configured to output the first parameter referenced by the first graphics program module identifier, and
- a second data structure that includes, in a pre-defined order, a plurality of second data structure identifiers; and the CPU
- receives the third graphics program module from the memory device, receives the second data structure from the memory device, determines that one of the plurality of second data structure identifiers is the same as the first graphics program module identifier, and modifies the third graphics program module to reference the first parameter by the identified memory location.

71. The system of claim 36 wherein:
the memory device further contains
- a third graphics program module configured to output an additional parameter referenced by a third graphics program module identifier, the second graphics program module being further configured to input the additional parameter by referencing the third graphics program module identifier, and
- a second data structure that includes, in a pre-defined order, a plurality of second data structure identifiers; and the CPU
- receives the third graphics program module from the memory device, receives the second data structure from the memory device, identifies an additional memory location in the shared memory, based on the pre-defined order of the second data structure identifiers, for one of the plurality of second data structure identifiers that is the same as the third graphics program module identifier, and
- modifies the second and third graphics program modules to reference the additional parameter by the additional identified memory location.

72. A computer readable medium having a computer program product having computer program instructions recorded thereon for interfacing a plurality of graphics program modules written to execute on a plurality of functional units of a graphics processor using a shared memory, the computer program product comprising:
- instructions for inputting a first graphics program module configured to output a first parameter referenced by a first graphics program module identifier;
- instructions for inputting a second graphics program module configured to input the first parameter by referencing the first graphics program module identifier;
- instructions for inputting a first data structure that includes, in a pre-defined order, a plurality of first data structure identifiers;
- instructions for identifying a memory location in the shared memory, based on the pre-defined order of the first data structure identifiers, for one of the plurality of first data structure identifiers that is the same as the first graphics program module identifier; and
- instructions for modifying the first and second graphics program modules to reference the first parameter by the identified memory location.

73. The computer program product of claim 72 wherein the first data structure includes, in a pre-defined order, a data type associated with each of the plurality of first data structure identifiers.

74. The computer program product of claim 73 further comprising:
- instructions for inputting information about characteristics of the shared memory, and
- wherein the instructions for identifying comprises instructions for identifying the memory location based on the information about the characteristics of the shared memory.

75. The computer program product of claim 74 wherein the information about the characteristics of the shared memory include number of registers, size of registers, or access performance of memory locations.

76. The computer program product of claim 72 wherein the plurality of first data structure identifiers is based upon the first graphics program module being a first type of graphics program module and the second graphics program module being a second type of graphics program module.

77. The computer program product of claim 72 wherein the plurality of first data structure identifiers is based upon the first graphics program module being a vertex program and the second graphics program module being a fragment program.

78. The computer program product of claim 73 further comprising:
- instructions for receiving a hardware profile describing capabilities of one functional unit of the plurality of functional units;
- instructions for determining resources required by the first data structure; and
- instructions for comparing the required resources with the capabilities of the one functional unit.

79. The computer program product of claim 78 wherein the capabilities include a data type compatible with the one functional unit.

80. The computer program product of claim 78 wherein the capabilities include a precision rating of the one functional unit.

81. The computer program product of claim 73 further comprising:
- instructions for receiving a hardware profile describing a memory configuration of the shared memory;
- instructions for determining resources required by the first data structure; and
- instructions for comparing the required resources with the memory configuration.

82. The computer program product of claim 81 wherein the memory configuration includes a number or registers.

83. The computer program product of claim 82 wherein the memory configuration includes a register size.

84. The computer program product of claim 72 wherein the first graphics program module is further configured to output an additional parameter referenced by an additional first graphics program module identifier, the computer program product further comprising:
instructions for determining that the second graphics program module does not input the additional parameter by referencing the additional first graphics program module identifier.

85. The computer program product of claim 84 further comprising:
instructions for notating a portion of the first graphics program module outputting the additional parameter;
instructions for compiling the first graphics program module except for the notated portion of the first graphics program module; and
instructions for compiling the second graphics program module.

86. The computer program product of claim 84 further comprising:
instructions for removing a portion of the first graphics program module outputting the additional parameter;
instructions for compiling the first graphics program module; and
instructions for compiling the second graphics program module.

87. The computer program product of claim 84 wherein the first data structure further includes a first data structure identifier among the plurality of first data structure identifiers that is the same as the additional first graphics program module identifier, the computer program product further comprising:
instructions for removing the first data structure identifier that is the same as the additional first graphics program module identifier from the first data structure.

88. The computer program product of claim 84 further comprising:
instructions for verifying that the additional parameter is not referenced by the additional first graphics program module identifier in any graphics program module in the plurality of graphics program modules.

89. The computer program product of claim 72 wherein the second graphics program module is further configured to input an additional parameter by referencing a second graphics program module identifier, the computer program product further comprising:
instructions for determining that the first graphics program module does not output the additional parameter referenced by the second graphics program module identifier.

90. The computer program product of claim 89 further comprising:
instructions for notating a portion of the second graphics program module inputting the additional parameter;
instructions for compiling the first graphics program module; and
instructions for compiling the second graphics program module except for the notated portion of the second graphics program module.

91. The computer program product of claim 89 further comprising:
instructions for removing a portion of the second graphics program module inputting the additional parameter;
instructions for compiling the first graphics program module; and
instructions for compiling the second graphics program module.

92. The computer program product of claim 89 wherein the first data structure further includes a first data structure identifier among the plurality of first data structure identifiers that is the same as the second graphics program module identifier, the computer program product further comprising:
instructions for removing the first data structure identifier that is the same as the second graphics program module identifier from the first data structure.

93. The computer program product of claim 72 wherein the first data structure further
includes an unused first data structure identifier among the plurality of first data structure identifiers, the computer program product further comprising:
instructions for determining that the first graphics program module does not reference the unused first data structure identifier; and
instructions for removing the unused first data structure identifier from the first data structure.

94. The system of claim 36 wherein the shared memory is a host memory, the system further comprising:
a system interface configured to interface with the CPU.

95. The system of claim 94, wherein the host memory is configured to interface with the system interface.

96. The system of claim 94, wherein the host memory is configured to directly interface with the CPU.

97. The system of claim 45 wherein the memory device is a host memory, the system further comprising:
a system interface configured to interface with the CPU.

98. The system of claim 97, wherein the host memory is configured to interface with the system interface.

99. The system of claim 97, wherein the host memory is configured to directly interface with the CPU.

* * * * *

UNITED STATES PATENT AND TRADEMARK OFFICE
CERTIFICATE OF CORRECTION

PATENT NO. : 7,268,785 B1
APPLICATION NO. : 10/327307
DATED : September 11, 2007
INVENTOR(S) : Glanville et al.

It is certified that error appears in the above-identified patent and that said Letters Patent is hereby corrected as shown below:

In column 31, line 12, please replace "base don", with -- based on --

In column 31, line 61, please replace "product having computer program instructions", with -- product and instructions --

Signed and Sealed this

Tenth Day of June, 2008

JON W. DUDAS
*Director of the United States Patent and Trademark Office*